(12) United States Patent
Hwang et al.

(10) Patent No.: US 11,644,937 B2
(45) Date of Patent: May 9, 2023

(54) ELECTRONIC DEVICE FOR DISPLAYING MESSAGE AND OPERATING METHOD THEREOF

(71) Applicant: Samsung Electronics Co., Ltd., Gyeonggi-do (KR)

(72) Inventors: Changhwan Hwang, Gyeonggi-do (KR); Younghak Oh, Gyeonggi-do (KR); Sunyoung Yi, Gyeonggi-do (KR); Kyuok Choi, Gyeonggi-do (KR); Kyoungtaek Kim, Gyeonggi-do (KR); Hoshin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 16/839,094

(22) Filed: Apr. 3, 2020

(65) Prior Publication Data
US 2020/0319754 A1 Oct. 8, 2020

(30) Foreign Application Priority Data
Apr. 3, 2019 (KR) .......................... 10-2019-0038943

(51) Int. Cl.
*G06F 3/0481* (2022.01)
*G06F 3/0482* (2013.01)
*G06F 3/0485* (2022.01)

(52) U.S. Cl.
CPC .......... *G06F 3/0481* (2013.01); *G06F 3/0482* (2013.01); *G06F 3/0485* (2013.01)

(58) Field of Classification Search
CPC .............................. G06F 3/0481; G06Q 50/01
See application file for complete search history.

(56) References Cited

U.S. PATENT DOCUMENTS

| 7,418,495 | B2 | 8/2008 | Glasser et al. |
| 8,433,761 | B2 * | 4/2013 | Williams ................ H04L 51/04 |
| | | | 709/206 |
| 9,560,001 | B1 * | 1/2017 | Collins ................... H04L 51/52 |
| 9,756,487 | B1 * | 9/2017 | Ghadialy .......... H04M 3/42382 |
| 9,870,124 | B2 * | 1/2018 | Nalliah ................... H04L 51/58 |

(Continued)

FOREIGN PATENT DOCUMENTS

| CN | 107992248 A | 5/2018 |
| CN | 108804194 A | 11/2018 |
| JP | 2018-055483 A | 4/2018 |

OTHER PUBLICATIONS

International Search Report dated Jul. 14, 2020.
European Search Report dated Mar. 25, 2022.

*Primary Examiner* — William L Bashore
*Assistant Examiner* — Nathan K Shrewsbury
(74) *Attorney, Agent, or Firm* — Cha & Reiter, LLC

(57) ABSTRACT

An electronic device and method are disclosed herein. The electronic device includes a display, a memory storing historical messages previously transceived, and a processor. The processor implements the method, including: based on reception of a new message, controlling the display to display a notification indicating the reception of the new message, detecting an input corresponding to the notification, and based on the user corresponding to the notification, controlling the display to display the new message and at least one historical message from among the historical messages and selected based on a designated time interval.

18 Claims, 22 Drawing Sheets

(56) References Cited

U.S. PATENT DOCUMENTS

| | | | |
|---|---|---|---|
| 9,954,996 B2 | 4/2018 | Christie et al. | |
| 10,438,179 B2* | 10/2019 | Tamagushi | G06Q 20/0655 |
| 10,540,599 B2* | 1/2020 | Chander | G06Q 50/01 |
| 10,877,784 B1* | 12/2020 | Testuggine | G06F 9/453 |
| 2004/0098462 A1* | 5/2004 | Horvitz | G06Q 10/107 |
| | | | 709/207 |
| 2004/0154022 A1* | 8/2004 | Boss | H04L 51/212 |
| | | | 719/310 |
| 2005/0111631 A1* | 5/2005 | Jordan | H04L 51/066 |
| | | | 455/413 |
| 2008/0301250 A1* | 12/2008 | Hardy | G06Q 10/107 |
| | | | 709/207 |
| 2009/0063637 A1* | 3/2009 | Sun | H04L 12/1831 |
| | | | 709/206 |
| 2009/0113315 A1* | 4/2009 | Fisher | H04L 12/1827 |
| | | | 715/758 |
| 2009/0138828 A1* | 5/2009 | Schultz | G06Q 10/10 |
| | | | 715/853 |
| 2009/0248612 A1* | 10/2009 | Morris | G06Q 10/10 |
| 2011/0010182 A1* | 1/2011 | Turski | H04L 51/08 |
| | | | 715/810 |
| 2011/0047280 A1* | 2/2011 | Eom | H04L 67/148 |
| | | | 709/228 |
| 2011/0231499 A1* | 9/2011 | Stovicek | H04L 51/42 |
| | | | 709/206 |
| 2012/0173633 A1* | 7/2012 | Balabhadrapatruni | |
| | | | G06Q 10/107 |
| | | | 709/206 |
| 2013/0047104 A1* | 2/2013 | Chen | G06F 3/0482 |
| | | | 715/765 |
| 2014/0287786 A1* | 9/2014 | Bayraktar | H04W 4/14 |
| | | | 455/466 |
| 2014/0351713 A1* | 11/2014 | Hallerstrom | H04M 19/04 |
| | | | 715/752 |
| 2015/0074615 A1* | 3/2015 | Han | G06F 21/31 |
| | | | 715/863 |
| 2015/0127755 A1 | 5/2015 | Roh et al. | |
| 2015/0188869 A1* | 7/2015 | Gilad | G06F 3/048 |
| | | | 715/752 |
| 2015/0188875 A1* | 7/2015 | Sharp | G06Q 10/10 |
| | | | 715/752 |
| 2016/0050165 A1* | 2/2016 | Thomas | H04L 51/216 |
| | | | 715/752 |
| 2016/0147387 A1* | 5/2016 | Rahman | G06F 40/258 |
| | | | 715/752 |
| 2016/0307249 A1* | 10/2016 | Ku | G06Q 50/01 |
| 2016/0313877 A1 | 10/2016 | Ha et al. | |
| 2017/0093769 A1* | 3/2017 | Lind | G09G 5/377 |
| 2017/0099358 A1* | 4/2017 | Perez | H04L 51/24 |
| 2017/0111882 A1 | 4/2017 | Bang et al. | |
| 2017/0168751 A1* | 6/2017 | Stevens | G06F 3/0683 |
| 2017/0286429 A1* | 10/2017 | Lange | G06F 16/9535 |
| 2017/0289085 A1 | 10/2017 | Kim | |
| 2018/0356952 A1* | 12/2018 | Boothroyd | H04L 51/10 |
| 2019/0018570 A1* | 1/2019 | Zeng | G06F 3/04845 |
| 2019/0138655 A1* | 5/2019 | Deets, Jr. | G06F 16/9535 |
| 2020/0211125 A1* | 7/2020 | McCuskey | G06Q 10/107 |
| 2020/0319754 A1* | 10/2020 | Hwang | G06F 21/36 |
| 2022/0070630 A1* | 3/2022 | Rubin | H04L 51/234 |

* cited by examiner

ELECTRONIC DEVICE FOR DISPLAYING MESSAGE AND OPERATING METHOD THEREOF

CROSS-REFERENCE TO RELATED APPLICATION(S)

This application is based on and claims priority under 35 U.S.C. 119 to Korean Patent Application No. 10-2019-0038943, filed on Apr. 3, 2019, in the Korean Intellectual Property Office, the disclosure of which is herein incorporated by reference in its entirety.

BACKGROUND

1) Field

Certain embodiments relate to an electronic device for displaying a message and an operating method thereof.

2) Description of Related Art

With advances in information communication technology and semiconductor technology, multi-function electronic devices are now commonly used. These multi-function electronic devices are produced in variants such as mobile communication terminals, personal digital assistants (PDAs), electronic notebooks, smart phones, personal computers (PCs), wearable devices, etc.

These electronic devices typically enable transceival of messages via communication with other electronic devices.

The above information is presented as background information only to assist with an understanding of the disclosure. No determination has been made, and no assertion is made, as to whether any of the above might be applicable as prior art with regard to the disclosure.

SUMMARY

When an electronic device receives a message, the electronic device may display a notification indicating is the presence of an unread new message on a display. When an input is received requesting display of the new message, the electronic device may display a conversational screen (e.g., a messaging user interface) including display of the new message, in addition to historical messages. This display arrangement includes draw backs which may cause inconvenience or annoyance to users. For example, it may be confusing to identify which message is the new message. Similarly, it may be unclear as to which of the historical messages are related to the new message or in the same conversation. Accordingly, certain embodiments are to provide a message display method and a device implementing the same, that allow for easier identification and editing of a new message.

The technical problem to be solved in this specification is not limited to the technical problem mentioned above, and other technical problems not mentioned will be clearly understood by those skilled in the art to which the disclosure belongs from the following description.

In accordance with certain embodiments, the electronic device may include a display, and a processor, a memory storing historical messages previously transceived by the electronic device, and instructions executable by the processor to cause the electronic device to: based on reception of a new message, control the display to display a notification indicating the reception of the new message, detect an input corresponding to the notification, and based on the input corresponding to the notification, control the display to display the new message and at least one historical message from among the stored historical messages, based on a designated time interval.

In accordance with certain embodiments, an operation method of an electronic device may include: storing in a memory historical messages previously transceived by the electronic device, based on reception of a new message, displaying on a display a notification indicating reception of the new message, detecting by a processor an input corresponding to the notification, and based on the input corresponding to the notification, displaying the new message and at least one historical message from among the stored historical messages, based on a designated time interval.

According to certain embodiments, an electronic device displays a new message and the previous transmission/reception message at different time points, based on a user input for the new message notification, thereby allowing the user to concentrate on the new message.

According to certain embodiments, the electronic device can improve the user's concentration degree on the new message by applying a highlighting effect to the new message, in the case of displaying a new message, based on a user input for a new message notification.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
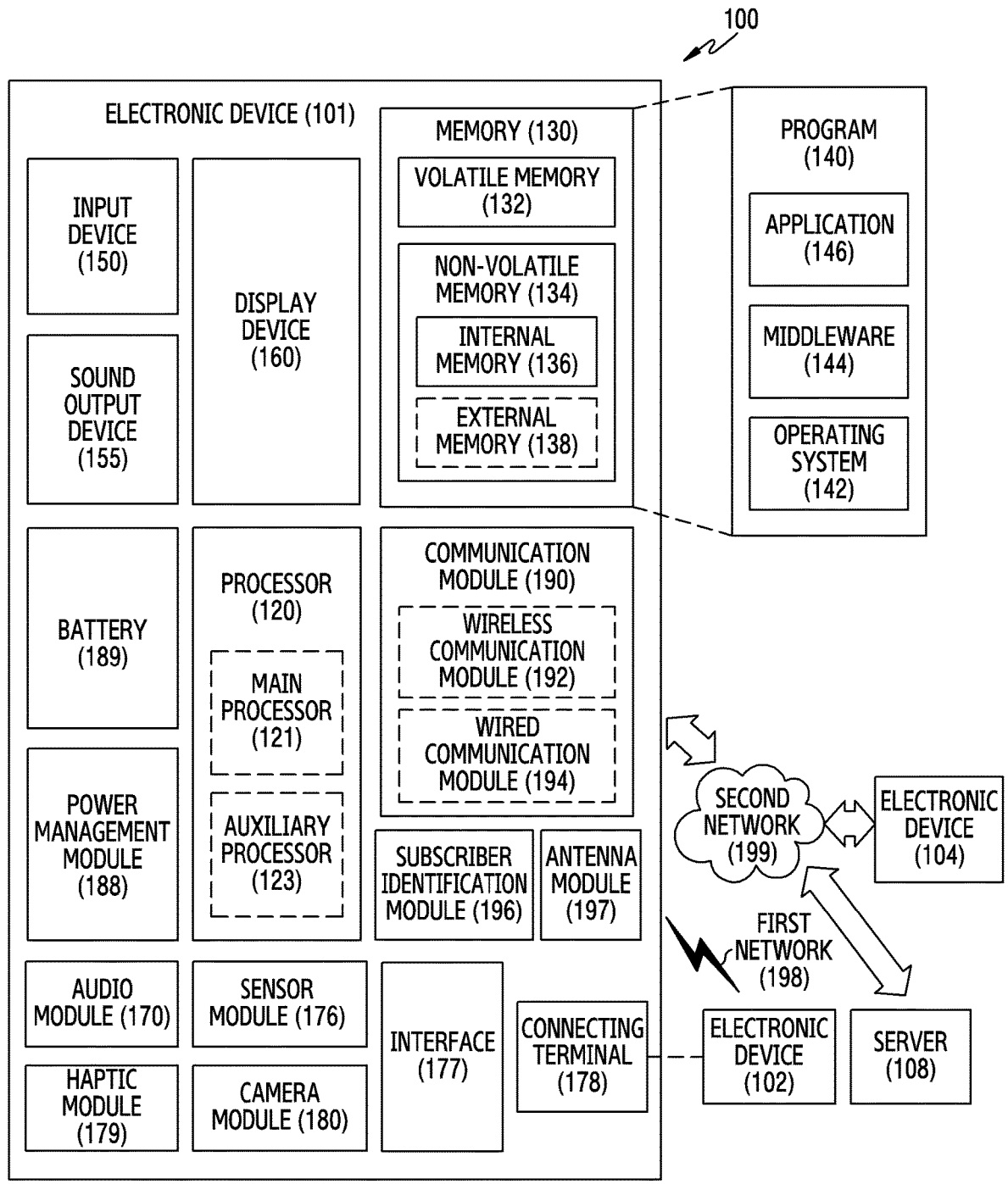
FIG. 1 is a block diagram of an electronic device in a network environment according to certain embodiments.

Hereinafter, certain embodiments will be described with reference to the accompanying drawings. The embodiments and terms used herein are not intended to limit the techniques described in this specification to specific embodiments, but should be understood to include various modifications, equivalents, and/or alternatives to the examples. In connection with the description of the drawings, similar reference numerals may be used for similar components. Singular expressions may include plural expressions unless the context clearly indicates otherwise.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, a processor 120 may display notification information indicating that a new message is received, when the message is received. The new message may include a message that the user has not identified, for example, an unidentified message. For example, when the message is received in a locked state of the electronic device, the processor 120 may display notification information indicating the reception of a new message on the lock screen. For another example, when the message is received while a first application is executing, the processor 120 may display notification information indicating reception of the new message in a status area located at an upper end of a display (e.g., a display device 160) on which an execution screen of the first application is being displayed, or in a designated area. The designated area may be an area overlapping at least a portion of the area in which the execution screen of the first application is displayed. The notification information indicating that a new message is received may include at least one of an icon of an application corresponding to the new message, at least a portion of contents included in the new message, identification information of another electronic device (or another user) associated with the new message (e.g., a phone number, or name), or time information at which the new message is received. The first application may be an application executable on the electronic device 101. For example, the first application may be a video application, a music application, a web browser application, a shopping application, a schedule application, a health application, a telephone application, or a game application. This is merely illustrative, and certain embodiments are not limited thereto.

According to an embodiment, the processor 120 may detect a user input for notification information for indicating that a new message has been received (hereinafter, for convenience of description, referred to as a "new message notification"). The user input may be an input for identifying and/or displaying a new message, and may include at least one of a single touch input, a double touch input, a long touch input, a pressure touch input, or a drag input. In an embodiment, the processor 120 may detect a user input for a new message notification displayed in a status area or a designated area while the execution screen of the first application is displayed on the display. According to an embodiment, the processor 120 may detect a user input for a new message notification displayed on the lock screen. When a user input for a new message notification displayed on the lock screen is detected, the processor 120 may display a lock release request screen. The lock release request screen may include at least one of a user input request message for lock release or an authentication information request message. For example, when authentication information for lock release is configured by the user, the lock release request screen may include an authentication information request message. The authentication information request message may include at least one of a password input request, a pattern drawing request, a fingerprint authentication request, or an iris authentication request. As another example, when the authentication information for lock release is not configured, the lock release request screen may include a message for requesting a user input for lock release. According to an embodiment, the processor 120 may release the lock, based on a user input on the lock release request screen.

According to an embodiment, the processor 120 may provide a second application execution screen including the new message to which a highlighting effect is applied by executing the second application related to the new message, in response to the detection of the user input for the new message notification. The second application may include at least one of a message application or an application that provides an instant message service. The processor 120 may display the new message and at least one message transmitted/received before on the second application screen, based on a designated time interval to provide the second application execution screen including the new message to which the highlighting effect is applied. The second application screen may be a screen indicating a message box corresponding to the new message. The designated time interval may be configured and/or changed by the designer and/or the user. According to an embodiment, when a user input for a new message notification is detected, the processor 120 may display a second application screen including at least a part of the new message at a first time point, and then additionally display at least one message previously transmitted/received at a second time point when a designated time elapses, on the second application screen. The at least one message previously transmitted/received may include a message previously transmitted/received with another electronic device (or user) corresponding to the new message. When the processor 120 displays a part of the new message on the second application screen at the first time point, the processor 120 may further display another part of the new message and at least one message previously transmitted/received at the second time point on the second application screen. For example, when the new message includes text content and image content, the processor 120 may control the display (e.g., the display device 160) to display the text content of the new message at the first time point (e.g., to the exclusion of other types of content), and may additionally display image content of the new message and at least one message previously transmitted/received at the second time point. According to an embodiment, the processor 120 may display at least one message previously transmitted/received at a first time point on the second application screen in response to the detection of a user input for a new message notification, and then may additionally display a new message on the second application screen at a second time point after a designated time elapsed. According to an embodiment, the processor 120 may apply the highlighting graphic effect to the new message to highlight the new message. The highlighting graphic effect may include at least one of an effect of changing the font of the text included in the new message (e.g., changing type, size, thickness, or color), changing the speech bubble of the new message (e.g., the size, color, or shape of the balloon), generating graphic objects in the new message to display, displaying the graphic object in the surrounding area of the new message, or displaying a new message in a pop-up. The highlighting graphic effects listed are merely illustrative for clarity of understanding, and certain embodiments will not be limited thereto. According to an embodiment, the highlighting graphic effect applied to the new message may be removed after a designated time elapses.

According to an embodiment, when there are a plurality of new messages related to the new message notification, the processor 120 may display the second application screen including the plurality of new messages at the first time point, and then may additionally display at least one message previously transmitted/received on the second application screen at a second time point after a designated time elapses. According to an embodiment, there are a plurality of new messages related to the new message notification, the processor 120 may select the most recently received (newly received) first message from the plurality of new messages, display the second application screen including the first new message selected at the first time point, and additionally display, on the second application screen, at least one message previously transmitted/received with the remaining new messages not selected from the plurality of new messages at a second time after a designated time elapses. According to an embodiment, there are a plurality of new messages related to the new message notification, the processor 120 may select designated number of second new messages from the plurality of new messages, display a second application screen including the second new messages selected at the first time point, and then, additionally display, on the second application screen, at least one message previously transmitted/received with the remaining new messages not selected from the plurality of new messages at a second time point after a designated time elapses. The second new messages may be selected based on contents (e.g., context) of messages previously transmitted/received with other electronic devices corresponding to the plurality of new messages. For example, the processor 120 may determine the content and meaning of a message last transmitted by the electronic device to another electronic device, and may process N second new messages highly related to the identified meaning among the plurality of new messages.

According to an embodiment, when there are a plurality of new messages related to the new message notification and the plurality of new messages correspond to different electronic devices (or correspond to different message box), the processor 120 may divide an area of the display (e.g., the display device 160) into at least two areas, and highlight the new message corresponding to the different electronic device (or correspond to the different message box) in each divided area. For example, when there are a plurality of new messages related to the new message notification, some of the plurality of new messages correspond to the first electronic device (or correspond to a first message box), and other parts of the plurality of new messages correspond to the second electronic device (or correspond to a second message box), the processor 120 may divide an area of the display into a first area and a second area. The processor 120 may display at least a portion of the new message corresponding to the first electronic device (or the first message box) at a first time point in the first area, and may display at least a part of the new message corresponding to the second electronic device (or the second message box) in the second area. The processor 120 may display a previously transmitted/received message related to the first electronic device (or related to the first message box) at the second time point in the first area, and display a previously transmitted/received message related to the second electronic device (or related to the second message box) in the second area. The processor 120 may apply the highlighting graphic effect to each new message displayed in each of the first area and the second area.

According to an embodiment, the processor 120 may execute a second application related to a new message and display a conversation list for each user to which a highlighting effect is applied to the message box including the new message, in response to the detection of a user input for a new message notification. The conversation list for each user may be a list including a plurality of message boxes corresponding to the plurality of users. The processor 120 may apply the highlighting effect to at least one message box including a new message among a plurality of message boxes included in the conversation list for each user. The highlighting effect may include at least one effect of changing the color of the message box, changing the size of the message box, synthesizing graphic objects in the message box and displaying, or displaying the graphic object in the peripheral area of the message box. The plurality of message boxes included in the conversation list for each user may be arranged based on a time point at which the message was last transmitted/received with the corresponding another electronic device. The processor 120 may determine the order of the at least one message box including the new message, based on a message box (fixed message box) designated to be fixed to the top of the conversation list for each user among the plurality of message boxes included in the conversation list for each user. According to an embodiment, when there is no fixed message box at the top of the conversation list for each user, the processor 120 may arrange and display at least one message box including a new message so as to be positioned at the top of the conversation list for each user. According to an embodiment, when there is a fixed message box at the top of the conversation list for each user, the processor 120 may arrange the at least one message box including the new message to be positioned below the fixed message box in the conversation list for each user, and control the display to display the at least one message box including the new message. For example, when there is a fixed message box in the conversation list for each user, the processor 120 may control the message box to be displayed on the display from a location where the at least one message box including the new message exists, without displaying from the upper end of the conversation list for each user. As another example, the processor 120 may select a portion of the conversation list for each user to be displayed on the display, based on at least one of the number of message boxes fixed in the conversation list for each user, the number of message boxes including new messages, or the number of message boxes that can be displayed on the screen. For example, when the number of fixed message boxes is 3, the number of message boxes is 1, and the number of message boxes that can be displayed on the screen is 4, the processor 120 may control the conversation list for each user to be displayed from the top so that three fixed message boxes and one message box including a new message may be displayed on the display. As another example, when the number of fixed message boxes is 4, the number of message boxes including new message is 1, and the number of message boxes that can be displayed on the screen is 4, the processor 120 may control the message box including the new message to be displayed on the display, without displaying the conversation list for each user from the top. In this case, when a user input dragged to the bottom is detected, the processor 120 may scroll down the conversation list for each user to display at least some of the message boxes fixed at the top on the display.

According to an embodiment, an electronic device (e.g., an electronic device 101 of FIG. 1) may include a display (e.g., a display device 160 of FIG. 1) and processor (e.g., a processor 120 of FIG. 1), and the processor 120 may, when receiving a new message, control the display to display a new message reception notification, detect a user input for the new message reception notification, and display the new message and at least one message transmitted/received before the new message, based on a predetermined time interval, in response to the user input.

According to an embodiment, the processor 120 may control the display to display the new message at a first time point and at least one message transmitted/received before the new message at a second time point in response to the user input, and the first time point and the second time point may have the designated time interval.

According to an embodiment, the first time point is a time point ahead of the second time point by the designated time interval, and the processor 120 may control the display to display a message application screen including the new message at the first time point, and additionally display the at least one previously transmitted/received message including the new message on the message application screen at the second time point.

According to an embodiment, the first time point is later than the second time point by the designated time interval, and the processor 120 may control the display to display a message application screen including at least one message transmitted/received before the new message at the second time point and additionally display the new message on a message application screen including at least one message transmitted/received before the new message at the first time point.

According to an embodiment, the processor 120 may apply a graphic effect for highlighting the new message at the first time point.

According to an embodiment, the graphic effect for highlighting the new message may be applied to at least one of the new message or a background area of the message application screen.

According to an embodiment, the processor 120 may remove the graphic effect at a third time point later than at least one of the first time point or the second time point.

According to an embodiment, when there are a plurality of new messages, the processor 120 may select at least one new message from the plurality of new messages and control the display to display a message application screen including the selected at least one new message at the first time point and to additionally display at least one new message which has not been selected from the previously transmitted/received messages and the plurality of new messages on a message application screen including the selected at least one new message at the second time point. The first time point may be a time point earlier than the second time point by the designated time interval.

According to an embodiment, when there are the plurality of new messages, the processor 120 may select at least one new message among the plurality of new messages, based on the contents of the new messages and the contents of the at least one previously transmitted/received message.

According to an embodiment, when the new message is received in the locked state of the electronic device, the processor 120 may control the display to display the new message reception notification on a lock screen, perform a lock release operation when a user input for the new message reception notification is detected, and display the new message and at least one message transmitted/received before the new message, based on a designated time interval, after performing the lock release operation.

According to an embodiment, when a user input for the new message reception notification is detected, the processor 120 may display a message requesting unlocking of the electronic device, and release the lock of the electronic device to perform the lock release operation, based on the input for releasing the lock of the electronic device.

In the above description, a method of highlighting a new message by displaying a new message and a previously transmitted/received message, based on a designated time interval is disclosed. According to an embodiment, the method for highlighting a new message as described above may be performed when a message previously transmitted/received exists in a message box related to the new message. For example, if there is no message previously transmitted/received in the message box related to the new message, the methods for highlighting the new message as described above may not be performed. According to an embodiment, the method for highlighting a new message as described above may be performed regardless of whether a message previously transmitted/received exists in a message box related to the new message (e.g., the highlighting function is perpetually active, barring a configuration setting rejecting highlighting).

Figure 2A:
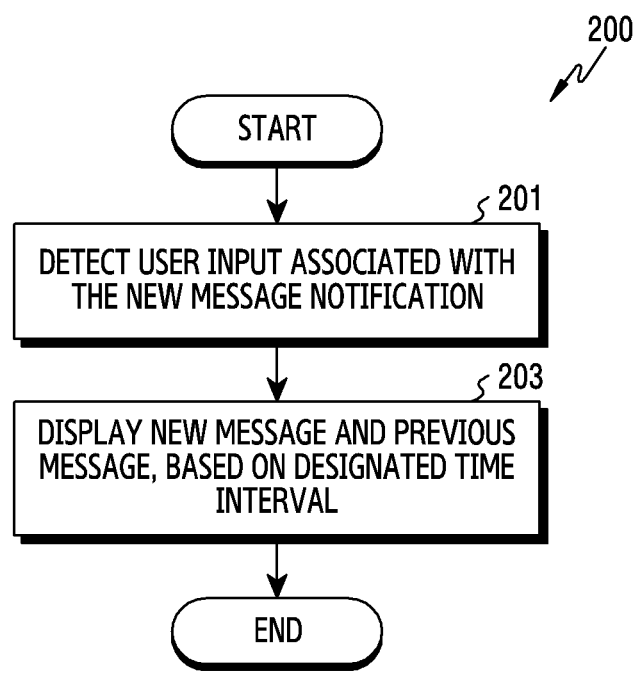
FIG. 2A is a flowchart for displaying a message in an electronic device according to certain embodiments.

FIG. 2A is a flowchart 200 for displaying a message in an electronic device according to certain embodiments. In the following embodiments, the operations may be performed sequentially, but are not necessarily performed sequentially. For example, the order of each operation may be changed and at least two operations may be performed in parallel. Here, the electronic device may be the electronic device 101 of FIG. 1.

Referring to FIG. 2A, according to certain embodiments, in operation 201, the electronic device (e.g., the processor 120 of FIG. 1) may detect a user input associated with a new message notification. The new message notification may include a displayed, selectable notification indicating that a new message has been received by the electronic device. The notification information indicating that a new message has been received may include, for example, an icon associated with an application corresponding to the new message (e.g., a messaging app), at least a portion of the content included in the new message (e.g., a textual preview), identification information (e.g., a phone number, or name) of another electronic device or another user associated with the new message (e.g., a device or sender name), or time information when the new message has been received (e.g., a timestamp). The new message notification may be displayed in a status area located on the top of the display on which the lock screen (e.g., a status bar) or the execution screen of an executing first application, or in any other appropriate designated area. According to an embodiment, the processor 120 may detect a user input requesting display of a new message. The user input may include at least one of a single touch input, a double touch input, a long touch input, a press touch input, or a drag input that is applied to the new message notification.

According to an embodiment, in operation 203, the electronic device (e.g., the electronic device 100) may display the new message and at least one historical message previously transmitted/received on the application screen, based on a designated time interval. The designated time interval may be configured and/or changed by the designer and/or the user. According to an embodiment, when an input for the notification requesting display of the new message is detected, the processor 120 may display a message application screen including at least a part of the new message at a first time point, and then, may additionally display, on the message application screen, at least one message previously transmitted/received at a second time point, after a designated time elapses. The at least one historical message previously transmitted/received may include a message previously transmitted/received with another electronic device (or user) that corresponds to the new message (e.g., a message belonging to a common conversational thread). According to an alternative embodiment, the processor 120 may display the at least one historical message previously transmitted/received at the first time point on the message application screen, in response to detecting the input requesting display of the new message, and then, may additionally display the new message on the message application screen at the second time point after a designated time elapses. According to an embodiment, the processor 120 may apply a highlighting graphic effect to the new message, in order to highlight the new message. The highlighting graphic effect may include at least one changing a style of the font of the text in a new message (e.g., change font-type, size, thickness, or color), changing a speech bubble of a new message (e.g., changing the size, color, or shape of a shape circumferentially enclosing the text of the message in a messaging user interface), generating a graphic object for display of the new message, displaying a graphic object in the surrounding area of the new message, or displaying the new message as a pop-up. The highlighting graphic effects listed are merely illustrative for clarity of understanding, and certain embodiments will not be limited thereto. According to an embodiment, the highlighting graphic effect applied to the new message may be removed after a designated time elapses.

Figure 2B:
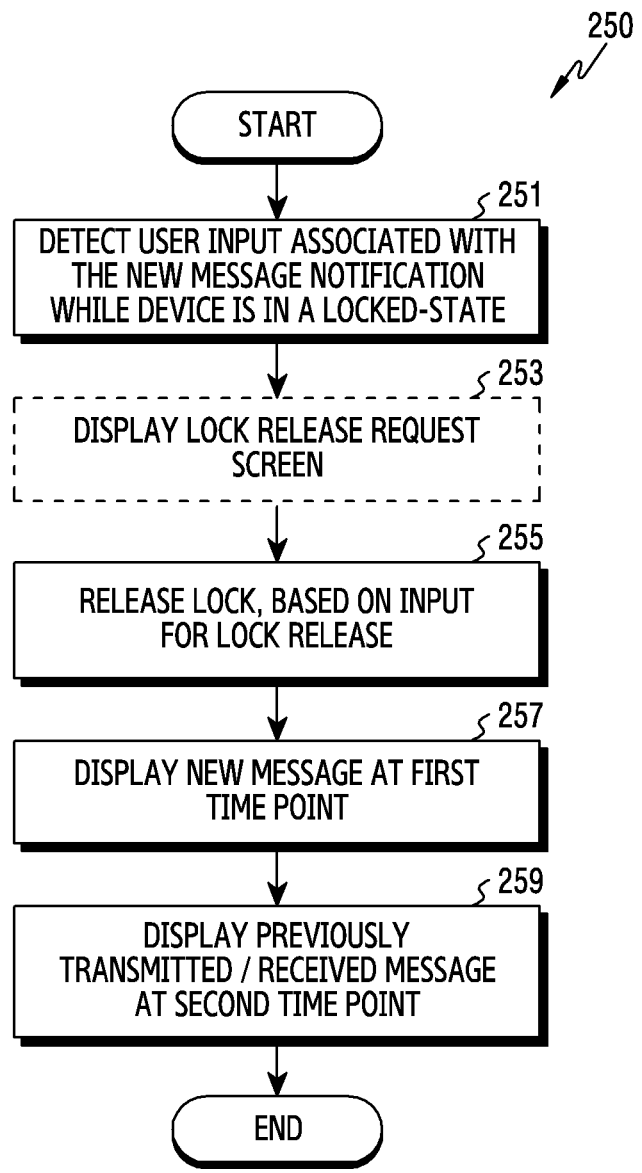
FIG. 2B is a flowchart illustrating a case where a user input for a new message notification displayed on a lock screen is detected in an electronic device according to certain embodiments.

FIG. 2B is a flowchart 250 illustrating an example situation in which a user input for a new message notification displayed on a lock screen is detected in an electronic device according to certain embodiments. The operations of FIG. 2B described below may be one of certain embodiments of FIG. 2A. For example, the operations of FIG. 2B may be the detailed operations of FIG. 2A. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 2B will be described with reference to FIGS. 3A to 3D. FIGS. 3A to 3D are screen configuration diagrams for displaying a message when a user input for a new message notification displayed on a lock screen is detected in an electronic device according to certain embodiments. Here, the operation indicated by the dotted line may be omitted according to an embodiment.

Referring to FIG. 2B, the electronic device (e.g., the processor 120 of FIG. 1) according certain embodiments may detect a user input associated with a new message notification while the electronic device is in a locked state, in operation 251. According to an embodiment, the processor 120 may detect a user input associated with a new message notification displayed on the lock screen, while the electronic device 101 is operating in the locked state 101. The user input for the new message notification may indicate an input requesting display of the corresponding new message, and may include, for example, at least one of a single touch input, a double touch input, a long touch input, a pressure touch input, or a drag input (e.g., to the notification itself). For example, as shown in FIGS. 3A to 3D, the processor 120 may control a display (e.g., the display device 160 of FIG. 1) to display a new message notification on the lock screen, and the user input 301, 311, 321, and 331 for the new message notification displayed on the lock screen may be detected.

Figure 3A:
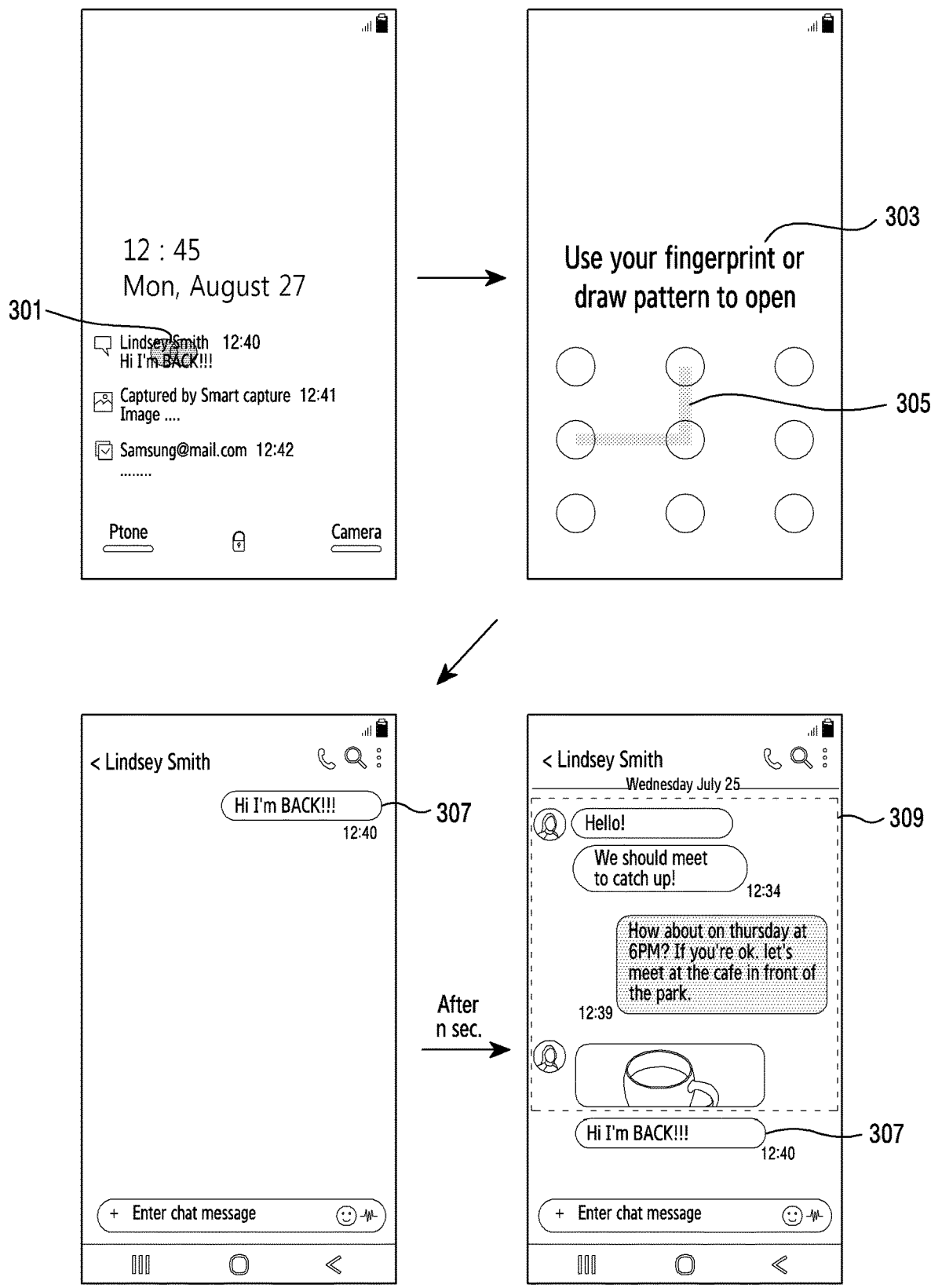
FIG. 3A is a screen configuration diagram for displaying a message when a user input for a new message notification displayed on a lock screen is detected in an electronic device according to certain embodiments.
Figure 3B:
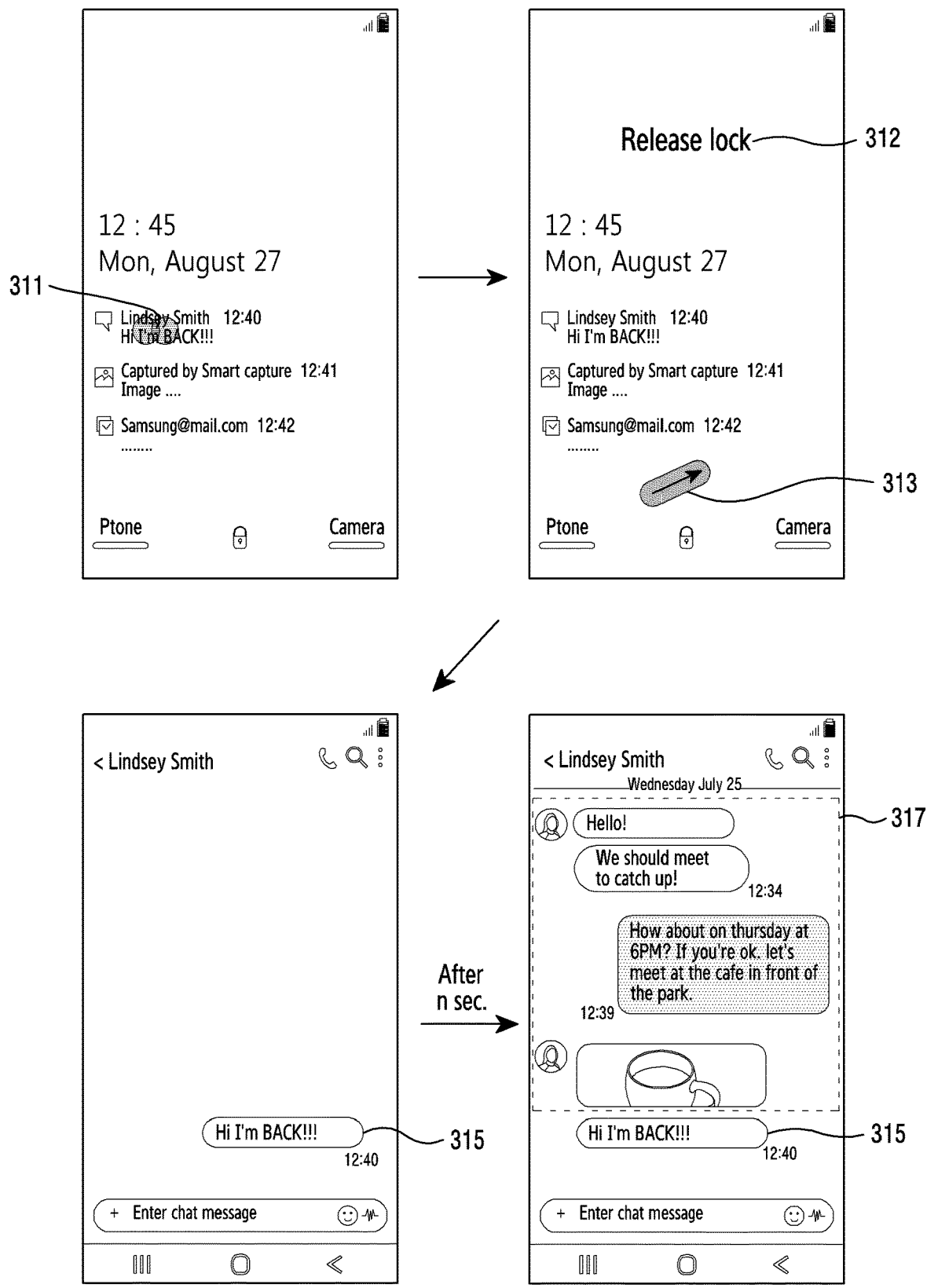
FIG. 3B is a screen configuration diagram for displaying a message when a user input for a new message notification displayed on a lock screen is detected in an electronic device according to certain embodiments.
Figure 3C:
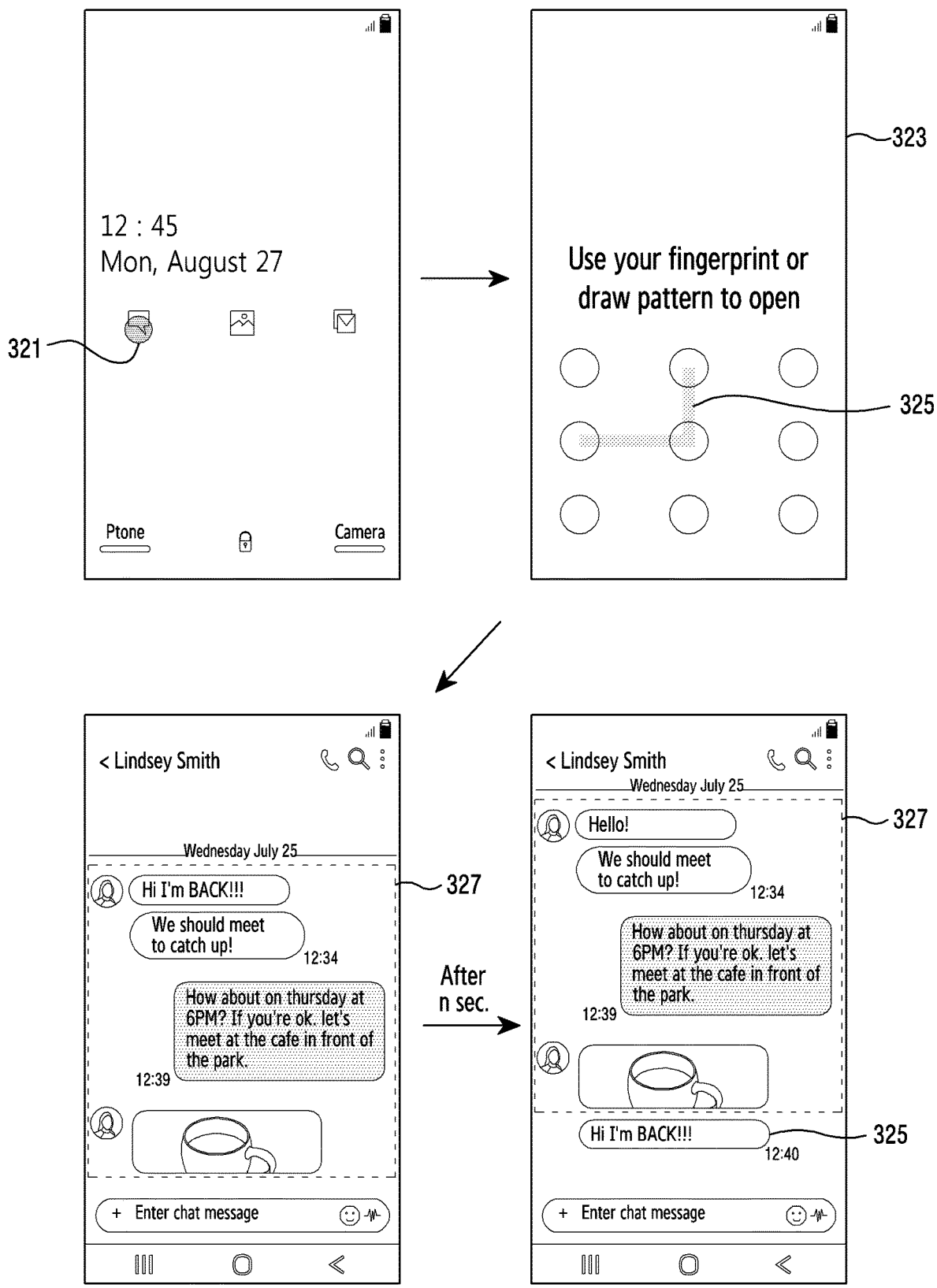
FIG. 3C is a screen configuration diagram for displaying a message when a user input for a new message notification displayed on a lock screen is detected in an electronic device according to certain embodiments.
Figure 3D:
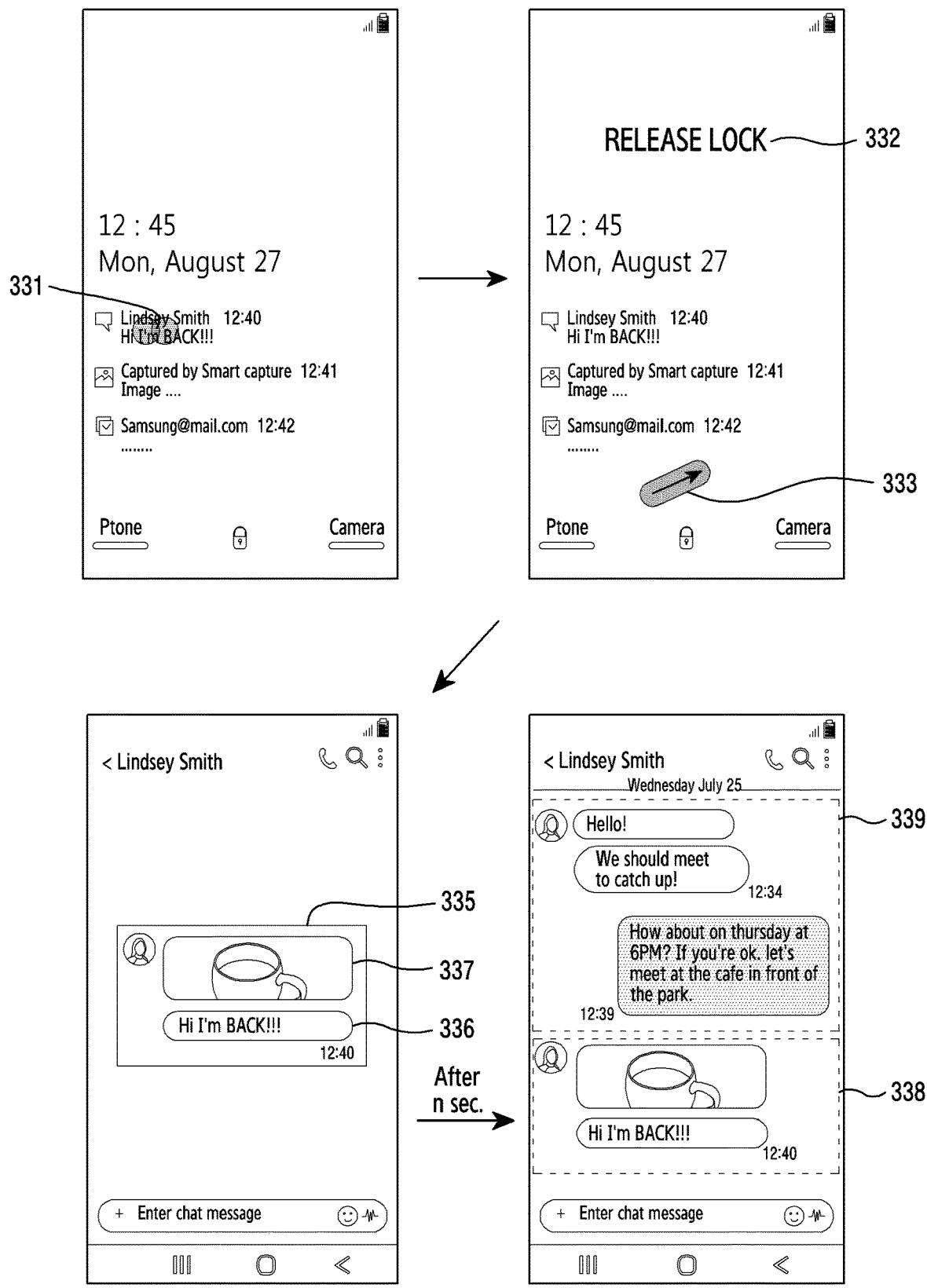
FIG. 3D is a screen configuration diagram for displaying a message when a user input for a new message notification displayed on a lock screen is detected in an electronic device according to certain embodiments.

According to an embodiment, the electronic device (e.g., the processor 120 or the display device 160) may display a lock release request screen in operation 253. The lock release request screen may include at least a prompt for a user input to release the lock, which may include or an authentication prompt (e.g., a message requesting input of authenticating information such as a password, pattern, pin number, or biometrics). According to an embodiment, when authentication information for lock releasing is preconfigured, the processor 120 may control the display (e.g., the display device 160 of FIG. 1) to display a lock release request screen including an authentication information request message. The authentication information request message may include at least one of a password input request, a pattern drawing request, a fingerprint authentication request, or an iris authentication request. For example, as illustrated in FIGS. 3A and 3C, the processor 120 may control the display 160 to display the lock release request screens 303 and 323 including a message requesting a fingerprint input or a pattern drawing. According to an embodiment, when authentication information for lock releasing is not preconfigured, the processor 120 may control the display 160 to display a lock release request screen including a message requesting a user input for lock releasing. For example, as illustrated in FIGS. 3B and 3D, the processor 120 may control the display 160 to display the lock release request screens 312 and 332 including a message requesting the lock releasing.

According to an embodiment, the electronic device (e.g., the processor 120) may release the lock-state, based on the input requesting a release of the lock-state in operation 255. According to an embodiment, when authentication information for lock releasing is preconfigured, the processor 120 may receive authentication information (e.g., password, pattern, fingerprint information, or iris information) from a user and compare the received authentication information with the preconfigured authentication information to release the lock of the electronic device 101.

For example, as illustrated in FIGS. 3A and 3C, the processor 120 may receive user inputs 305 and 325 including a drawing pattern and compare the pattern generated by the user input with preconfigured pattern information. When a match is detected, the lock of the electronic device 101 may be released. According to an embodiment, when authentication information for releasing the lock-state is not preconfigured, the processor 120 may receive a user input (e.g., a single touch input, a double touch input, a long touch input, or drag input) in a designated area, and may release the lock of the electronic device 101 in response to the user input. For example, as illustrated in FIGS. 3B and 3D, the processor 120 may receive drag inputs 313 and 333 and release the lock of the electronic device 101 in response to the drag input.

According to an embodiment, in operation 257, the electronic device (e.g., the processor 120 and/or the display device 160 of FIG. 1) may display a new message, the display of which may occur at a first time point. According to an embodiment, the processor 120 may control the display (e.g., the display device 160) to display a message application screen including a new message corresponding to a new message notification from which a user input is detected, at a first time point. The message application screen may include, for example, at least one identification related to one or more counterpart electronic devices (e.g., phone number or a user name), a display area displaying messages transmitted/received with the at least one counterpart electronic device, and/or a message input area for composing a message for transmission. The processor 120 may control the display 160 to display a new message in an upper area, a lower area, or a designated area of a conversation content display area in a message application screen, or to display a separate pop-up window including a new message. The designated areas may be configured and/or changed by designers and/or users.

For example, the processor 120 may control the display 160 to display the new message "Hi I'm BACK" 307 in the upper area of the conversation content display area on the message application screen, as shown in FIG. 3A. As another example, the processor 120 may control the display 160 to display a new message "Hi I'm BACK" 315 in a designated area of the conversation content display area on the message application screen, as shown in FIG. 3B. As another example, the processor 120 may control the display 160 to display a new message "Hi I'm BACK" 329 in the lower area of the conversation content display area on the message application screen, as shown in FIG. 3C. As another example, as illustrated in FIG. 3D, the processor 120 may control the display 160 to display a separate pop-up window 335 including an image 337, which is a new message, and a "Hi I'm BACK" 336 while the message application screen is displayed. According to an embodiment, the processor 120 may apply the highlighting graphic effect to the new message to highlight the new message.

According to an embodiment, the electronic device (e.g., the processor 120 and/or the display device 160) may display at least one historical message previously transmitted/received at the second time point in operation 259. According to an embodiment, the processor 120 may control the display (e.g., the display device 160) to display at least one message previously transmitted/received at a second time point. The second time point may be defined by a lapse of a designated time interval relative to the first time point, at which the new message was displayed on the message application screen. The at least one previously transmitted/received historical message may include a message previously transmitted/received with another electronic device (or user) corresponding to the new message.

For example, when a designated time (e.g., about n seconds) has elapsed from the time when the new message "Hi I'm BACK" 307 is displayed in the upper area of the message application screen as illustrated in FIG. 3A, the processor 120 may control the display 160 to additionally display at least one previously transmitted/received message 309, while changing the display position of the new message 307 on the message application screen. The processor 120 may provide a graphic effect in which at least one historical message is displayed at a top of the corresponding message application screen, and then gradually moves downward whereas a new message is displayed at the top of the message application screen. In this way, a visual effect clearly indicating the new and historical messages may be provided for convenience of use.

According to an embodiment, when a new message is displayed at the bottom of the message application screen at a first time point, a visual effect may be provided in which a new message and historical messages are scrolled from the bottom up, at the second time point. In another example, when the designated time (e.g., about "n" seconds) elapses from the first time at which the new message "Hi I'm BACK" 315 is displayed, the processor 120 may control the display 160 to additionally display at least one historical message 317 on the message application screen in tandem with the new message 315. The processor 120 may control the display 160 to display at least one historical message previously transmitted/received, at the top of the corresponding message application screen while maintaining the display position of the new message 307 on the message application screen.

As another example, as shown in FIG. 3D, when a designated time (e.g., approximately "n" seconds) elapses from the time when a separate pop-up window 335 is displayed including the new message 336 and image 337, the processor 120 may control the display 160 to remove the pop-up window and display a message application screen including a new message 338 and at least one historical message 339 previously transmitted/received. According to an embodiment, the processor 120 may control the display 160 to display a message application screen including at least one historical message, at a second time point before the first time point when the new message is displayed and to additionally display the new message at a first time point after a predetermined time elapses from the second time point.

For example, as illustrated in FIG. 3C, if a designated time (e.g., about "n" seconds) elapses from the second time point when an application screen including at least one historical message 327 previously transmitted/received is displayed, the processor 120 may change the display position of at least one message 327 previously transmitted/received on the message application screen, and control the display 160 to additionally display the new message 329. As described above, according to an embodiment, the first time point may be earlier than the second time point, or the first time point may be later than the second time point.

Figure 4:
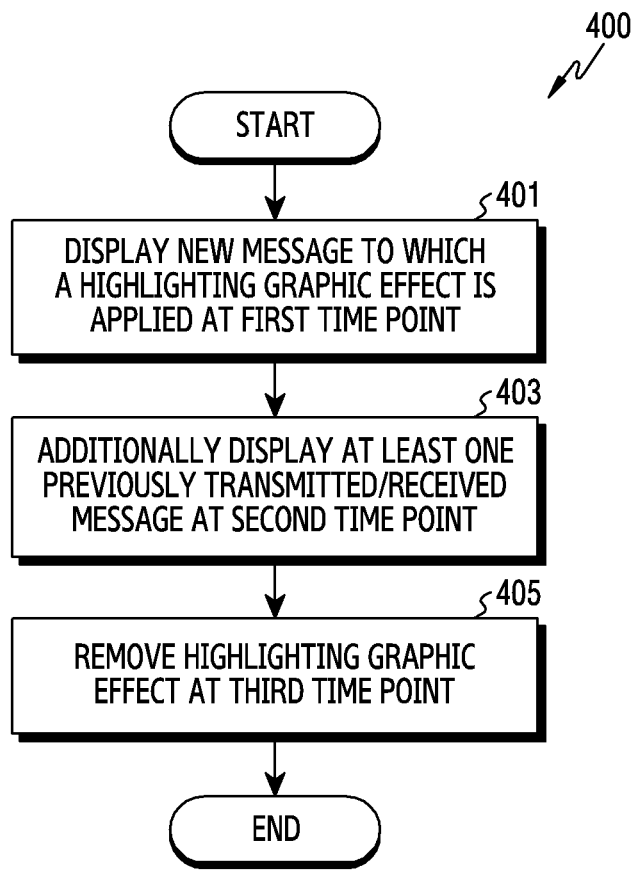
FIG. 4 is a flowchart for highlighting a new message in an electronic device according to certain embodiments.
Figure 5A:
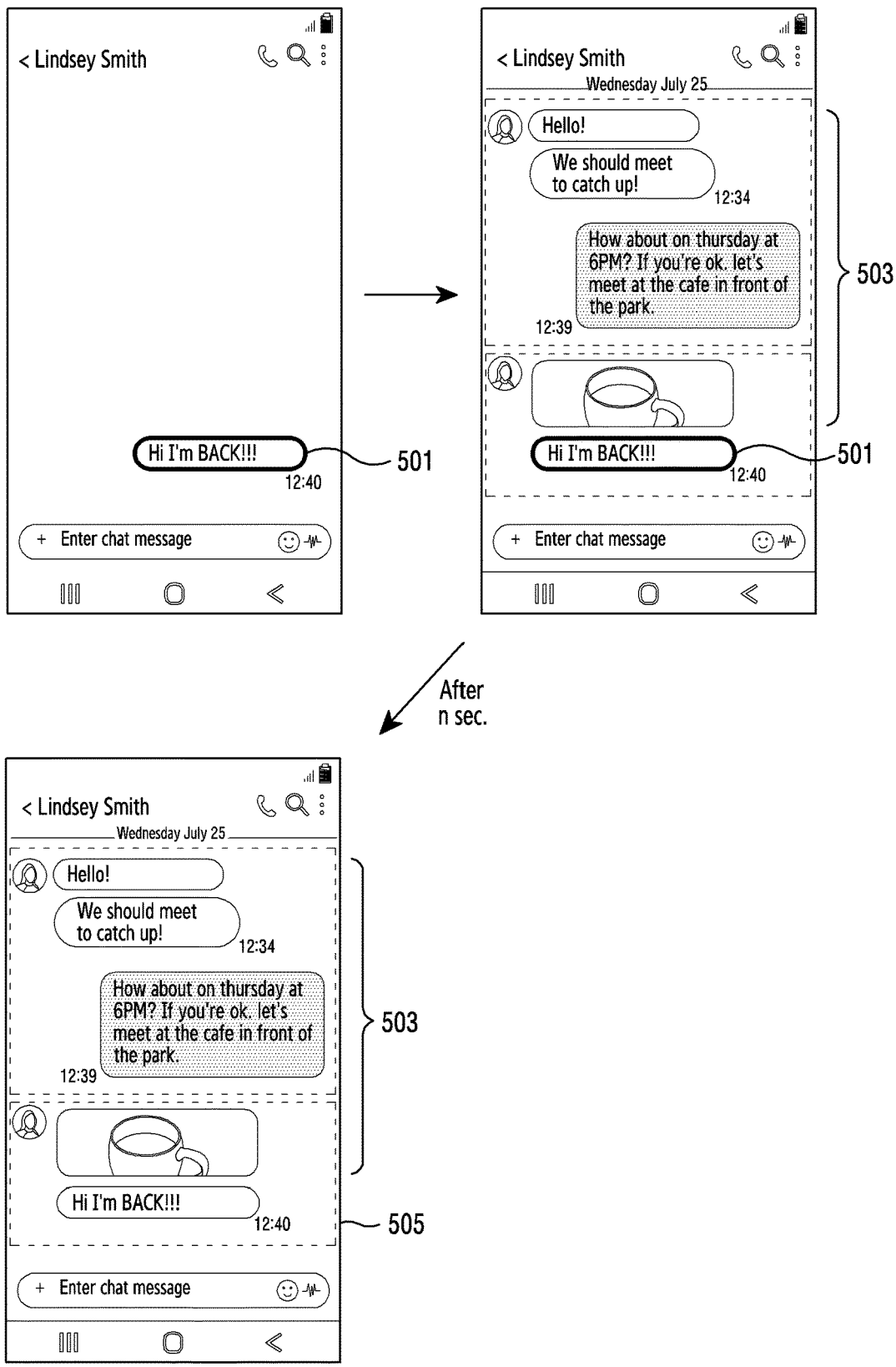
FIG. 5A is a screen configuration diagram for highlighting a new message in an electronic device according to certain embodiments.
Figure 5B:
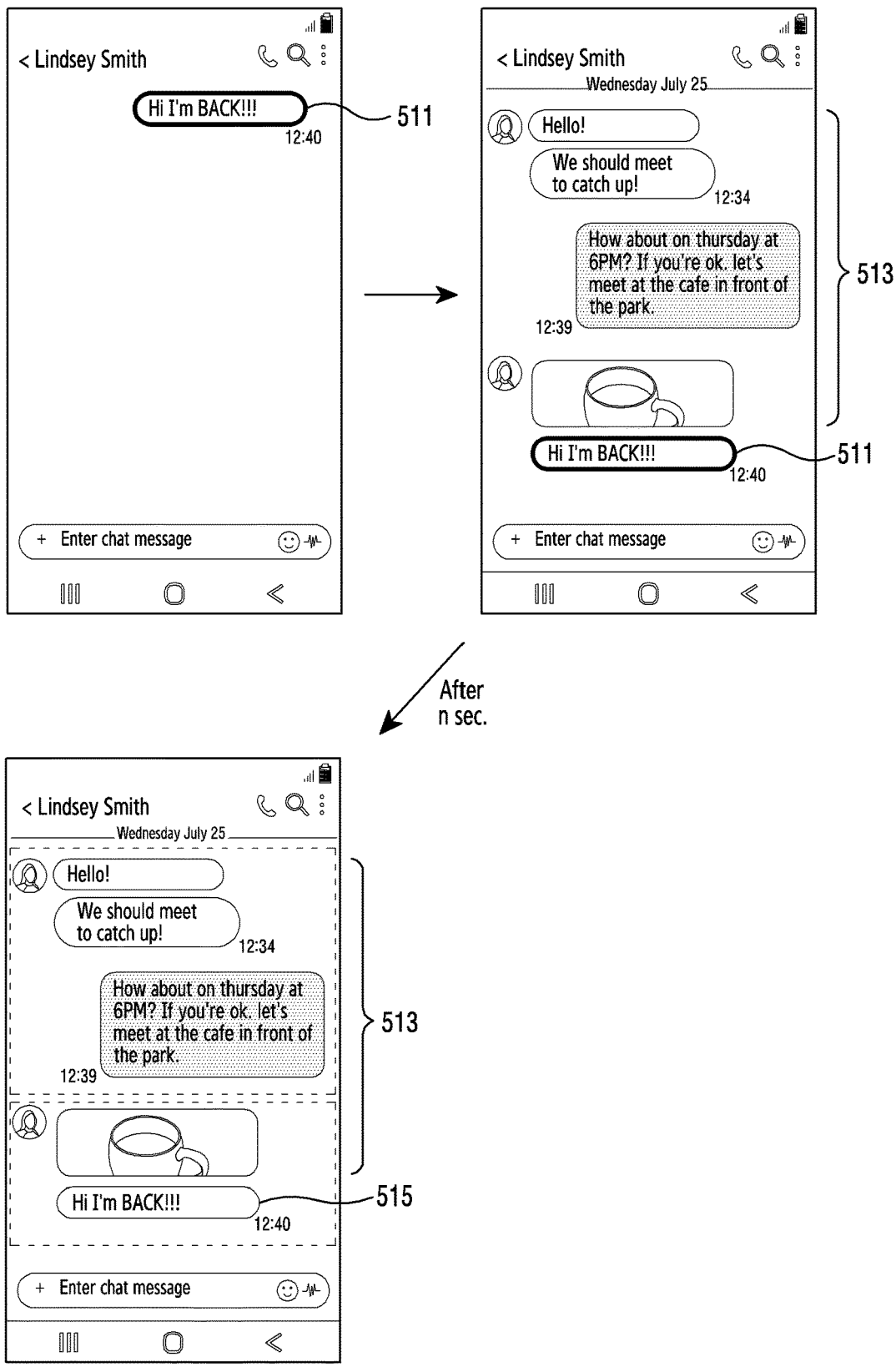
FIG. 5B is a screen configuration diagram for highlighting a new message in an electronic device according to certain embodiments.

FIG. 4 is a flowchart 400 for highlighting a new message in an electronic device according to certain embodiments. The operations of FIG. 4 described below may be at least part of an example of certain embodiments of FIGS. 2A and/or 2B. For example, the operations of FIG. 4 may be at least some of operations 203 of FIG. 2A or at least some of operations 257 and 259 of FIG. 2B. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 4 will be described with reference to FIGS. 5A and 5B. FIGS. 5A and 5B are screen configuration diagrams for highlighting a new message in an electronic device according to certain embodiments.

Referring to FIG. 4, an electronic device (e.g., the processor 120 of FIG. 1 and/or the display device 160) according to certain embodiments may display a new message to which the highlighting graphic effect is applied at a first time point in operation 401. According to an embodiment, the processor 120 may control a display (e.g. the display device 160) to display a message application screen including a new message to which the highlighting graphic effect is applied at a first point of time, in response to the detection of a user input for a new message notification. The highlighting graphic effect may include at least one of an effect of changing the font of the text included in a new message (e.g., changing the type, size, thickness, or color), an effect of changing the speech bubble (or border) of a new message (e.g. changing the bubble size, color, or shape), an effect of generating a graphic object in a new message to display, an effect of displaying a graphic object in a peripheral area (or background area) of a new message, or an effect of displaying a new message in a pop-up. The highlighting graphic effects listed are merely illustrative for clarity of understanding, and certain embodiments are not limited thereto. For example, in response to the detection of a user input for a new message notification, as shown in FIG. 5A, the processor 120 may control the display 160 to display a bold edge of the speech bubble including the new message, while displaying the new message "Hi I'm BACK" 501 in the lower area of the conversation content display area on the message application screen. As another example, in response to the detection of a user input for a new message notification, as illustrated in FIG. 5B, the processor 120 may control the display 160 to display a new message "Hi I'm BACK" 501 in the upper area of the conversation content display area on the message application screen, while making the bold edge of the speech bubble including the new message.

According to an embodiment, the electronic device (e.g., the processor 120 and/or the display device 160) may additionally display at least one message previously transmitted/received at the second time point in operation 403. According to an embodiment, the processor 120 may control the display 160 to additionally display at least one previously transmitted/received message on the message application screen at a second time after a designated time (for example, about n seconds) elapses from the first time when the new message is displayed. The processor 120 may change or maintain the display position of the new message in order to additionally display at least one message previously transmitted/received on the message application screen. For example, as shown in FIG. 5A, the processor 120 may control the display 160 to additionally display at least one message 503 transmitted/received while maintaining the display position of the new message 501 to which the highlighting graphic effect is applied, if the designated time elapses after the new message 501 with the highlighting graphic effect is displayed in the lower area of the conversation content display area on the message application screen. As another example, as illustrated in FIG. 5B, the processor 120 may control the display 160 to additionally display at least one message 513 previously transmitted/received while changing the display position of the new message 501 to which the highlighting graphic effect is applied, if the designated time elapses after the new message 511 with the highlighting graphic effect is displayed in the upper area of the conversation content display area on the message application screen.

According to an embodiment, the electronic device (e.g., the processor 120 and/or the display device 160 of FIG. 1) may remove the highlighting graphic effect at a third time point, in operation 405. According to an embodiment, the processor 120 may remove the highlighting graphic effect applied to the new message, when a designated time elapses from the second time point. For example, as illustrated in FIGS. 5A and 5B, the processor 120 may display new messages 505 and 515 from which the highlighting graphic effect is removed, when the designated time elapses from the second time point at which the new messages 501 and 511 and at least one messages 503 and 513 previously transmitted/received are displayed. According to an embodiment, the time interval between the first time point and the second time point, and the time interval between the second time point and the third time point may be the same or different.

Figure 6:
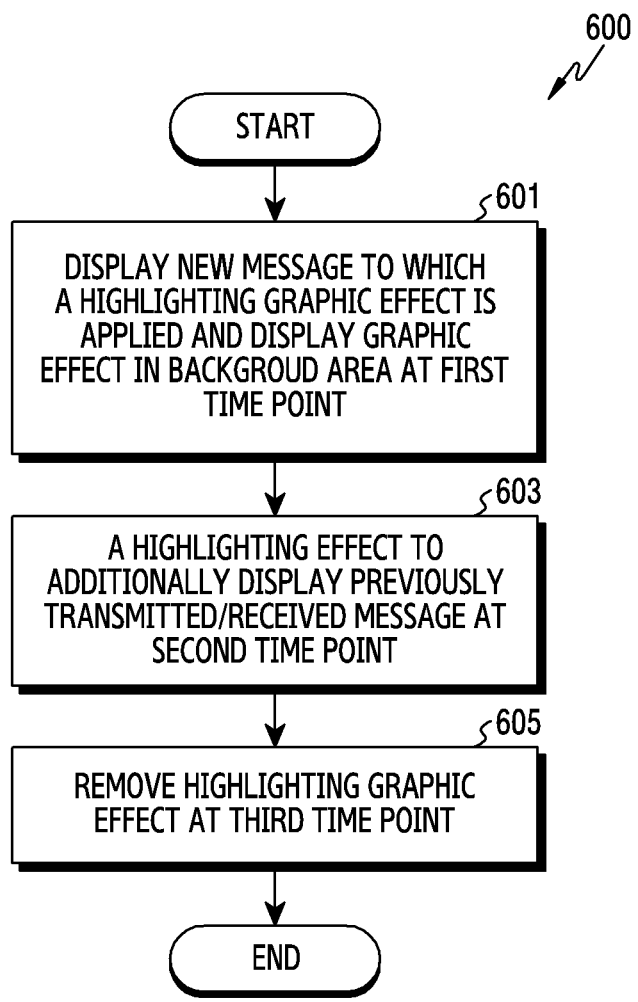
FIG. 6 is a flowchart for highlighting a new message in an electronic device according to certain embodiments.
Figure 7:
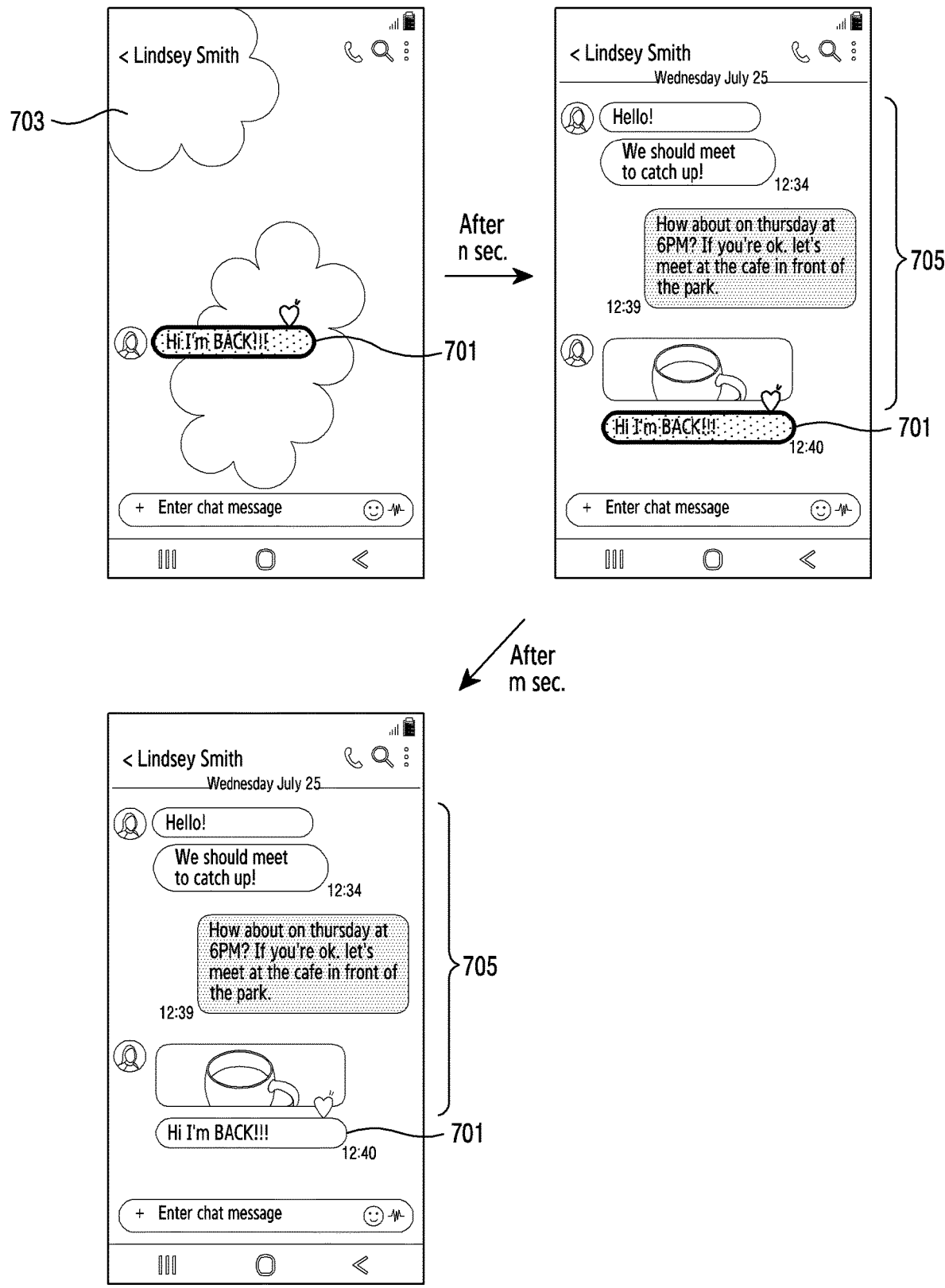
FIG. 7 is a screen configuration diagram for highlighting a new message in an electronic device according to certain embodiments.

FIG. 6 is a flowchart 600 for highlighting a new message in an electronic device according to certain embodiments. The operations of FIG. 6 described below may be at least a part of an example of certain embodiments of FIGS. 2A and/or 2B. For example, the operations of FIG. 6 may be at least some of operations 203 of FIG. 2A or at least some of operations 257 and 259 of FIG. 2B. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 6 will be described with reference to FIG. 7. FIG. 7 is a screen configuration diagram for highlighting a new message in an electronic device according to certain embodiments.

Referring to FIG. 6, the electronic device (e.g., the processor 120 and/or the display device 160 of FIG. 1) according to certain embodiments may display a new message to which the highlighting graphic effect is applied, and display the graphic effect in the background area at a first time point, in operation 601. According to an embodiment, the method of displaying the new message to which the highlighting graphic effect is applied at the first time point may be the same as operation 401 of FIG. 4. According to an embodiment, the processor 120 may control the display (e.g., the display device 160) to apply a highlighting graphic effect to a back ground area of a message application screen, while displaying a message application screen including a new message to which the highlighting graphic effect is applied at the first time point, in response to the detection of a user input for a new message notification. The application of the graphic effect to the background area may be for indicating that a previous transmission/reception message exists, not just a new message included in the corresponding message box. For example, the processor 120 may apply a graphic effect to the background area of the message application screen, indicating that the new message is not the first message in the corresponding message box and at least one message transmitted/received before the new message exists. For example, in response to the detection of a user input for a new message notification, as shown in FIG. 7, the processor 120 may control the display 160 to apply a graphic effect 703 to a background area. The graphic effect 703 may be applied while displaying the new message 701, for which a highlighting graphic effect is applied (e.g., the new message 701 displayed in the lower area the message application screen). The graphic effects applied to the background screen may be configured and/or changed by the designer and/or the user. The graphic effect applied to the background screen may include an animation effect in which at least one graphic object moves.

According to an embodiment, the electronic device (e.g., the processor 120 and/or the display device 160) may additionally display the previously transmitted/received message by removing the graphic effect applied to the background area at the second time point, in operation 603. According to an embodiment, the processor 120 may control the display 160 to remove the graphic effect applied to the background area and to further display at least one message previously transmitted/received on the message application screen, when a second time at which a designated time (e.g., about n seconds) elapses from the first time point when the new message is displayed. The processor 120 may change or maintain the display position of the new message in order to additionally display at least one message previously transmitted/received on the message application screen. The processor 120 may maintain the highlighting graphic effect applied to the new message at the second time point. For example, as illustrated in FIG. 7, the processor 120 may additionally display at least one historical message 705 previously transmitted/received while removing the graphic effect applied to the background area, and change the display position of the new message 701 to which the highlighting graphic effect is applied. The change may occur when the designated time elapses after a time point at which the new message 701 (with the highlighting graphic effect) is displayed.

According to an embodiment, the electronic device (e.g., the processor 120 and/or the display device 160 of FIG. 1) may remove the highlighting graphic effect at a third time point, in operation 605. According to an embodiment, operation 605 may be the same as operation 405 of FIG. 4.

In FIG. 6 described above, a method of applying a graphic effect to a background area of a message application screen at a first time point and displaying at least one message previously transmitted/received after removing the graphic effect of the background area at a second time point has been described. However, according to an embodiment, the processor 120 may apply a graphic effect (e.g., a mosaic effect, a blur effect, etc.) to at least one previously transmitted/received message at a first time point at which the new message is displayed and display the at least one previously transmitted/received message together with the new message so that the new message can be highlighted. The processor 120 may remove the graphic effect applied to at least one message previously transmitted/received, when a designated time elapses since the first time point, the second time point. As seen in FIG. 7, after a designated time elapses (e.g., after m seconds), the highlighting effect is no longer applied to the new message 701.

The above-described FIGS. 4 to 7 are examples of a case in which the first time point is earlier than the second time point. For example, in response to the detection of a user input for a new message notification, the new message is displayed before the previously transmitted/received message. However, according to certain embodiments, the first time point may be later than the second time point. For example, in response to the detection of a user input for a new message notification, the new message may be displayed later than the previous transmission/reception message. Hereinafter, a case in which the first time point is later than the second time point will be described in FIG. 8.

Figure 8:
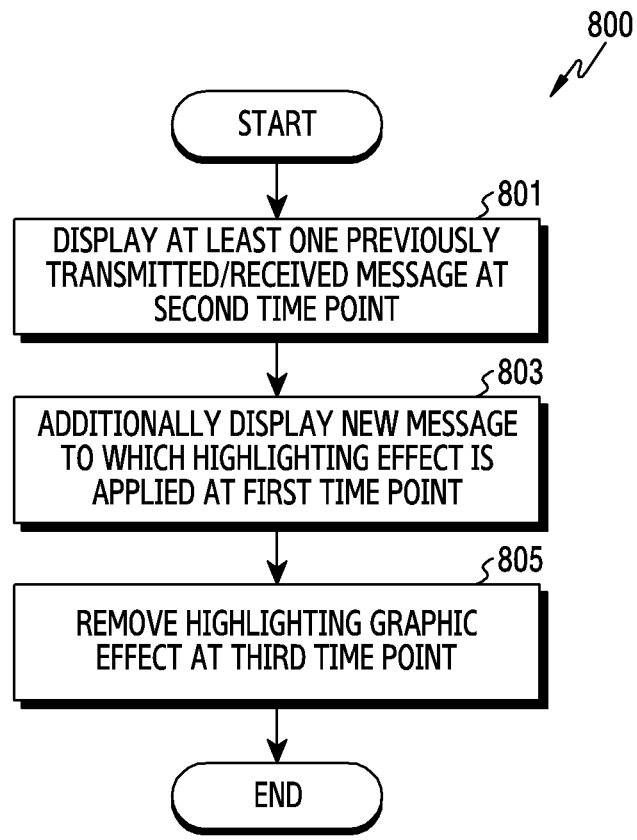
FIG. 8 is a flowchart for highlighting a new message in an electronic device according to certain embodiments.
Figure 9:
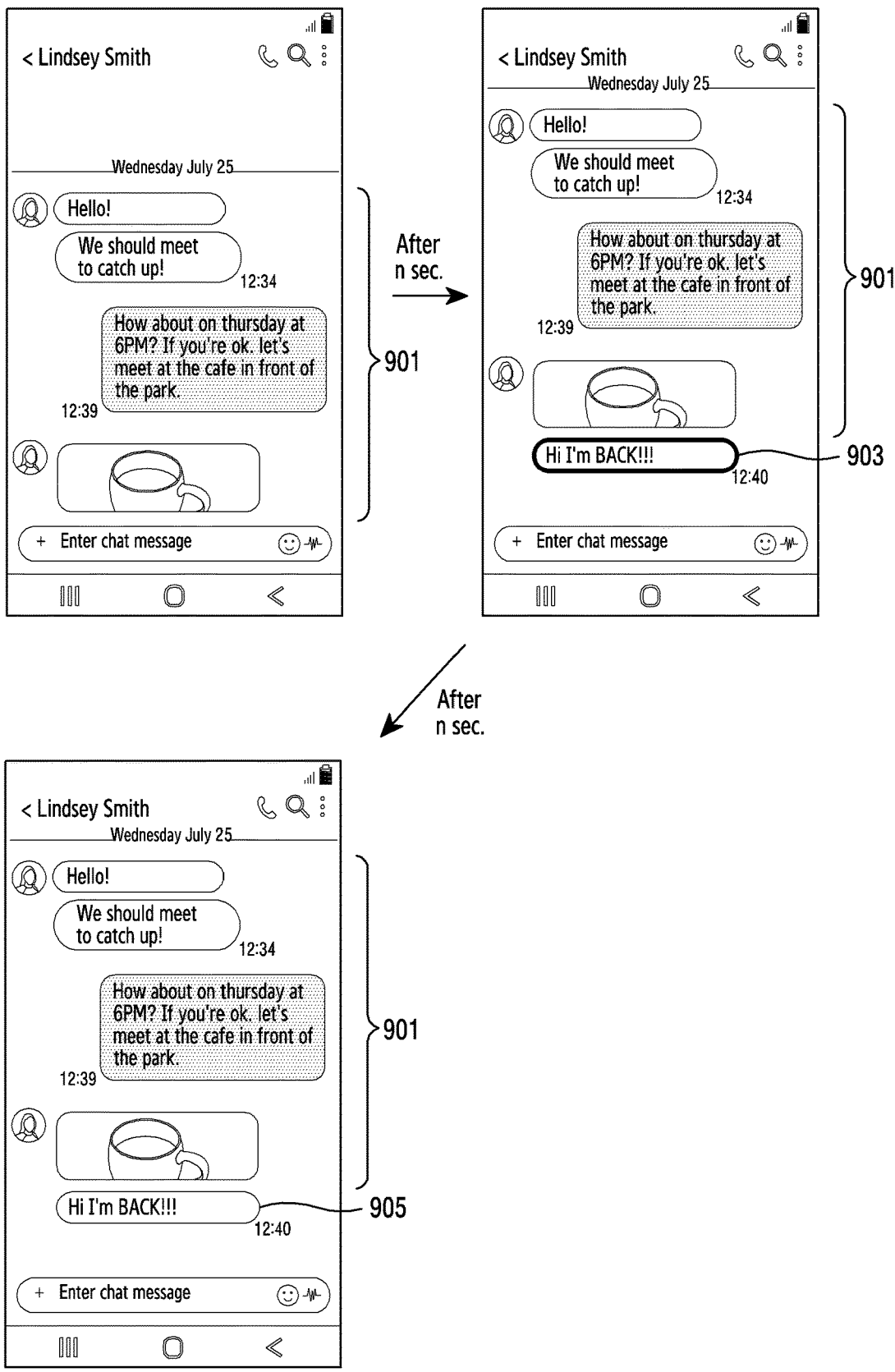
FIG. 9 is a screen configuration diagram for highlighting a new message in an electronic device according to certain embodiments.

FIG. 8 is a flowchart 800 for highlighting a new message in an electronic device according to certain embodiments. The operations of FIG. 6 described below may be at least part of an example of certain embodiments of FIGS. 2A and/or 2B. For example, the operations of FIG. 6 may be at least some of operations 203 of FIG. 2A or at least some of operations 257 and 259 of FIG. 2B. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 8 will be described with reference to FIG. 9. FIG. 9 is a screen configuration diagram for highlighting a new message in an electronic device according to certain embodiments.

Referring to FIG. 8, in operation 801, an electronic device (e.g., the processor 120 and/or the display device 160 of FIG. 1) according to certain embodiments may display at least one historical message that was previously transmitted/received at the second time point. According to an embodiment, in response to the detection of a user input for a new message notification, the display (the display device 160) may be controlled to display a message application screen including at least one message previously transmitted/received at a second time point. For example, as shown in FIG. 9, in response to the detection of a user input corresponding to a new message notification, a message application screen may be displayed, including display of at least one historical message 901 previously transmitted/received at a second time point.

According to an embodiment, the electronic device (e.g., the processor 120 and/or the display device 160) may additionally display a new message to which a highlighting graphic effect is applied at the first time point, in operation 803. According to an embodiment, the processor 120 may additionally display, on the message application screen, a new message to which the highlighting graphic effect is applied, at the first time point after a designated time elapses from the second time point. The processor 120 may change the display position of at least one message previously transmitted/received on the message application screen to display the new message. For example, as illustrated in FIG. 9, when the predetermined time elapses from the second time point, the processor 120 may change the display position of at least one message 901 previously transmitted/received on the message application screen, and additionally display a new message 903 to which the highlighting graphic effect is applied.

According to an embodiment, the electronic device (e.g., the processor 120 and/or the display device 160) may remove the highlighting effect at a third time point, in operation 805. According to an embodiment, when a third time point is reached, the third time point occurring after the first time point by the designated time interval, the processor 120 may remove the highlighting graphic effect applied to the new message. For example, as shown in FIG. 9, when the designated time elapses from the first time point at which the new message 903 and at least one message 901 previously transmitted/received are displayed, the processor 120 may display a new message 905 from which the highlighting graphic effect is removed. According to an embodiment, the time interval between the first time point and the second time point, and the time interval between the second time point and the third time point may be the same or different.

Figure 10:
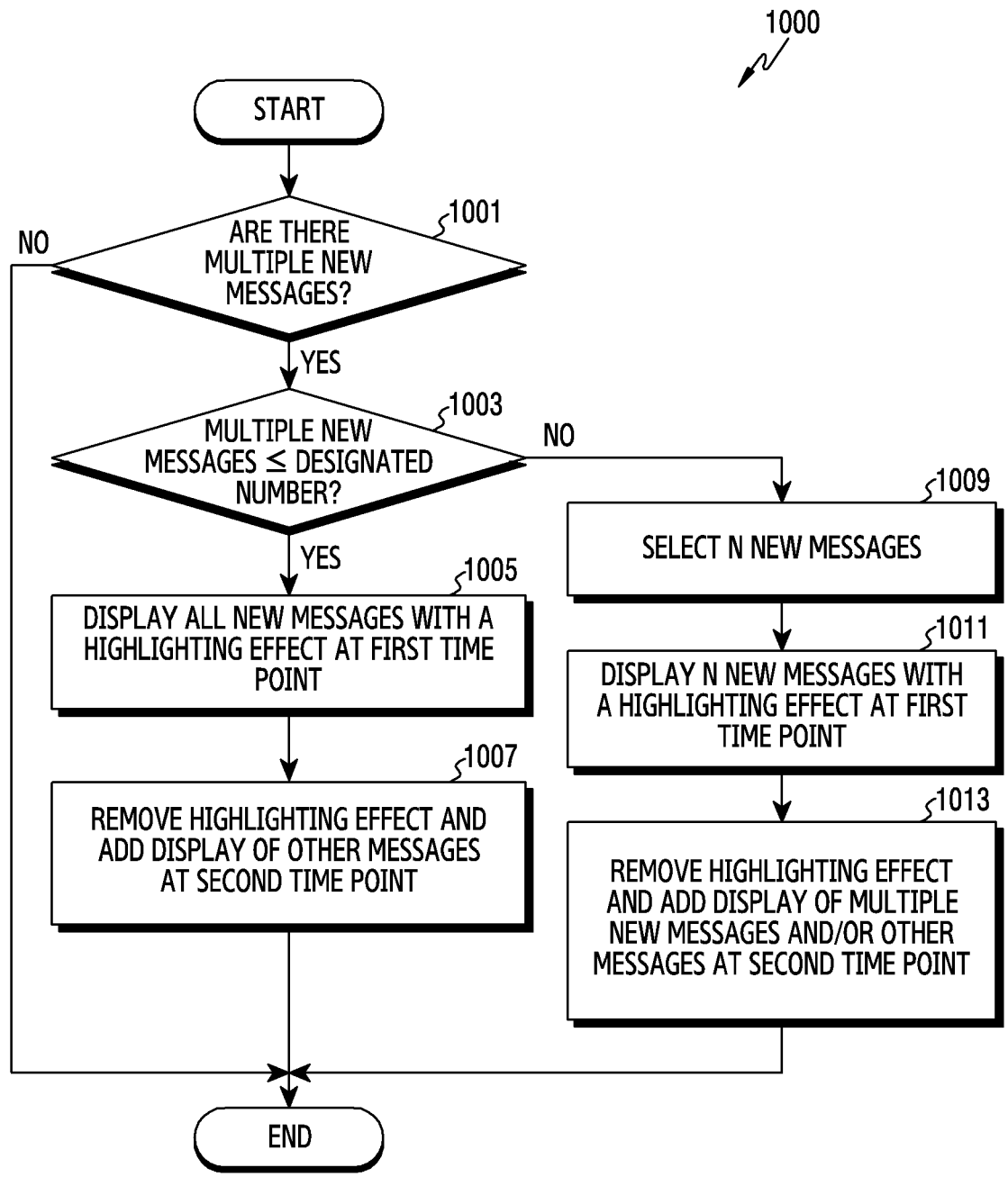
FIG. 10 is a flowchart for highlighting a plurality of new messages in an electronic device according to certain embodiments.
Figure 11A:
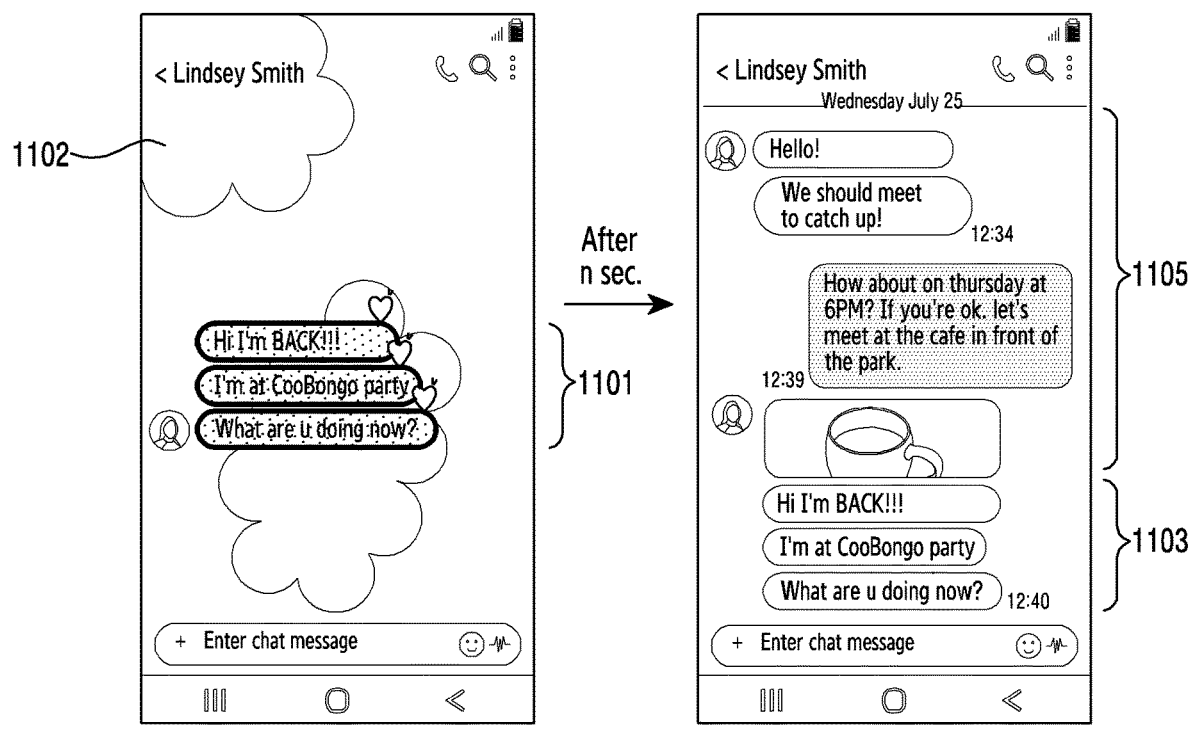
FIG. 11A is a screen configuration diagram for highlighting a plurality of new messages in an electronic device according to certain embodiments.
Figure 11B:
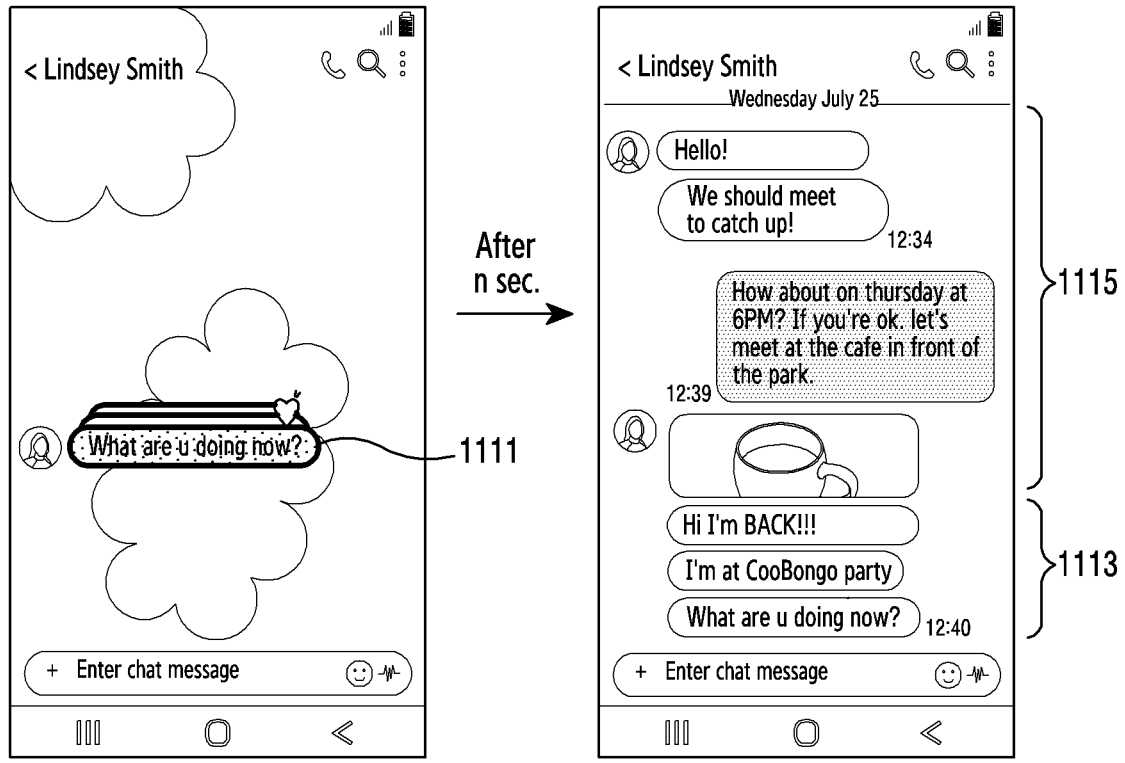
FIG. 11B is a screen configuration diagram for highlighting a plurality of new messages in an electronic device according to certain embodiments.
Figure 11C:
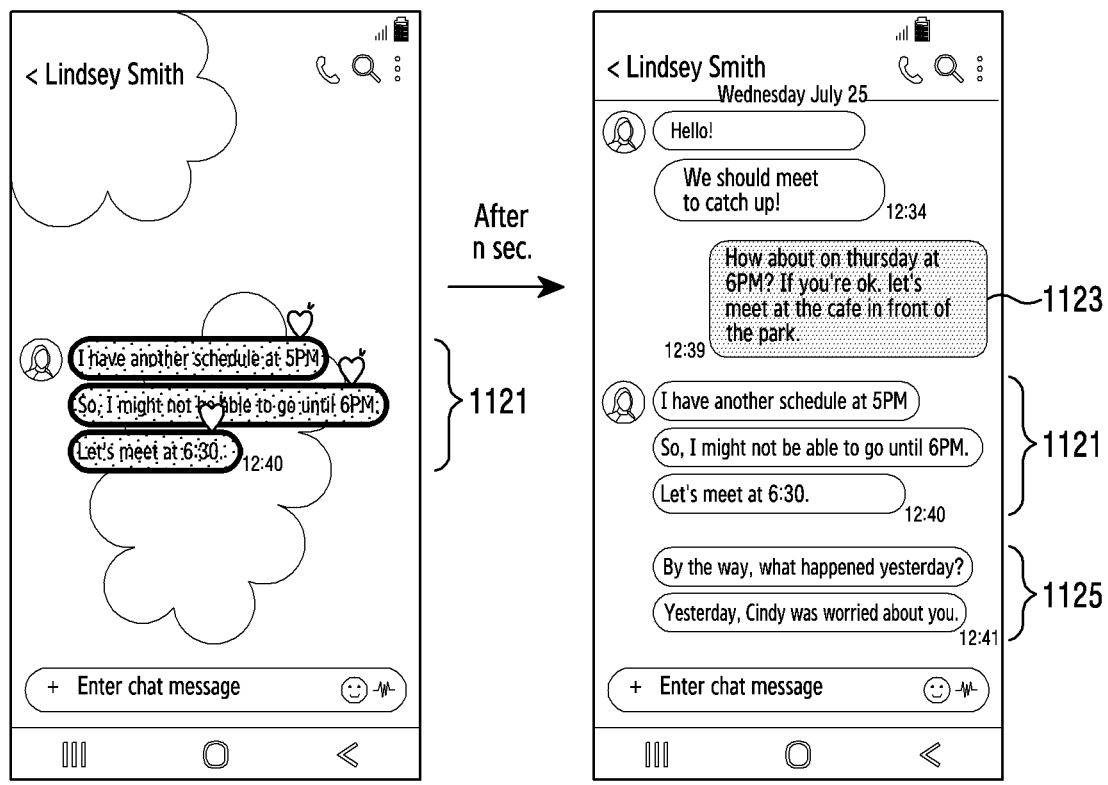
FIG. 11C is a screen configuration diagram for highlighting a plurality of new messages in an electronic device according to certain embodiments.

FIG. 10 is a flowchart 1000 for highlighting a plurality of new messages in an electronic device according to certain embodiments. The operations of FIG. 10 described below may be at least part of an example of certain embodiments of FIGS. 2A and/or 2B. For example, the operations of FIG. 10 may be at least some of operations 203 of FIG. 2A or at least some of operations 257 and 259 of FIG. 2B. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 10 will be described with reference to FIGS. 11A to 11C. FIG. 11A is a screen configuration diagram for highlighting a plurality of new messages in an electronic device according to certain embodiments, FIG. 11B is a screen configuration diagram for highlighting a plurality of new messages in an electronic device according to certain embodiments, and FIG. 11C is a screen configuration diagram for highlighting a plurality of new messages in an electronic device according to certain embodiments.

Referring to FIG. 10, the electronic device (e.g., the processor 120 of FIG. 1) according to certain embodiments may determine whether there are a plurality of new messages related to a new message notification, in operation 1001. For example, the processor 120 may determine whether there are a plurality of messages (e.g., unopened or unviewed messages) that the user has not yet accessed in the message box corresponding to the new message notification for which the user input is detected.

According to an embodiment, when there are a plurality of new messages related to a new message notification, the electronic device (for example, the processor 120) may determine whether a count (e.g., number) of the plurality of new messages is less than or equal to a designated number, in operation 1003. The designated number may be configured and/or changed by the designer and/or the user.

According to an embodiment, when the number of the plurality of new messages is less than or equal to the designated number, the electronic device (e.g., the processor 120 and/or the display device 160 of FIG. 1) may display the plurality of new messages to which the highlighting graphic effect is applied at the first time point, in operation 1005. According to an embodiment, the processor 120 may control the display (e.g., the display device 160) to display a message application screen including a plurality of new messages to which the highlighting graphic effect is applied, in response to the detection of a user input for a new message notification. For example, as illustrated in FIG. 11A, the processor 120 may display a message application screen including a plurality of new messages 1101 to which a highlighting graphic effect is applied. The processor 120 may apply the graphic effect 1102 to the background area of the message application screen to indicate that there was at least one message transmitted/received before the plurality of new messages. As another example, as illustrated in FIG. 11B, the processor 120 may control a plurality of new messages 1111 to which the highlighting graphic effect is applied to overlap each other and be displayed. The processor 120 may arrange the plurality of new messages, based on a reception time and then control the new messages to overlap each other and be displayed.

According to an embodiment, the electronic device (e.g., the processor 120 and or the display device 160) may remove the highlighting graphic effect at the second time point in operation 1007, and may additionally display at least one message previously transmitted/received. According to an embodiment, when a designated time elapses since the first time point, the second time point, at which the plurality of new messages are displayed, the processor 120 may remove the highlighting graphic effect applied to the plurality of new messages and control the display 160 to additionally display at least one message previously transmitted/received on the message application screen. For example, as illustrated in FIGS. 11A and 11B, when the designated time elapses from the first time point at which the plurality of new messages 1101 and 1111 are displayed, the processor 120 may control the display 160 to display the new messages 1103 and 1113 from which the highlighting graphic effect is removed, and the previously transmitted/received messages 1105 and 1115.

According to an embodiment, when the number of the plurality of new messages is greater than a designated number, the electronic device (e.g., the processor 120) may select N new messages among the plurality of new messages, in operation 1009. The number N of the selected new messages may be configured and/or changed by the designer and/or the user. According to an embodiment, the processor 120 may select N new messages among a plurality of new messages, based on contents (e.g., context) of the previously transmitted/received messages. For example, the processor 120 may determine the content and meaning of a message last transmitted by the electronic device to another electronic device in a corresponding message box including a plurality of new messages, and may select N new messages highly related to the identified meaning among the plurality of new messages.

According to an embodiment, the electronic device (e.g., the processor 120 and/or the display device 160) may display N new messages to which the highlighting graphic effect is applied at the first time point, in operation 1011. According to an embodiment, the processor 120 may control a display (e.g., the display device 160) to display a message application screen including N new messages to which the highlighting graphic effect is applied, in response to the detection of a user input for a new message notification. For example, as illustrated in 11C, the processor 120 may display a message application screen including the plurality of new messages 1121 to which the highlighting graphic effect is applied.

According to an embodiment, the electronic device (e.g., the processor 120 and/or the display device 160) may remove the highlighting graphic effect at a second time point in operation 1013, and display a plurality of new messages and at least one previously transmitted/received message. According to an embodiment, when a designated time interval elapses since the first time point, the second time point, when the N selected new messages are displayed, the processor 120 may control the display 160 to display a message application screen including N new messages from which the highlighting graphic effect is removed, another at least one new message not selected among the plurality of new messages, and at least one previously transmitted/received message. For example, as illustrated in FIG. 11C, when the designated time elapses from the first time point at which the three selected new messages 1121 are displayed, the processor 120 may control the display 160 to display three new messages 1121 from which the highlighting graphic effect is removed, new messages 1125 that were not selected, and the previously transmitted/received messages 1123 on the message application screen. According to an embodiment, the processor 120 may control the display 160 to display the message application screen including at least some of the plurality of new messages, based on the number and/or amount of the plurality of new messages at a second time point. For example, if the number and/or amount of the plurality of new messages is greater than the number and/or amount that can be displayed on the screen at one time, the message application screen displayed at the second time point may not include a previously transmitted/received message but include at least some of the new messages (e.g., excluding the older messages).

Figure 12:
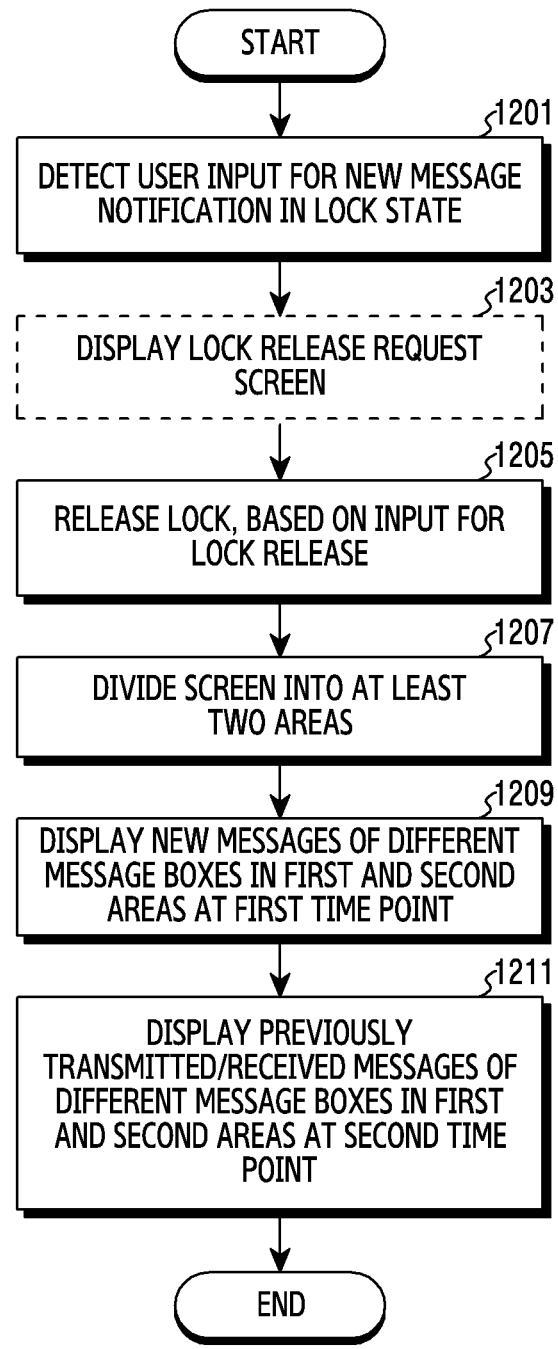
FIG. 12 is a flowchart for highlighting a plurality of new messages related to different users in an electronic device according to certain embodiments.
Figure 13:
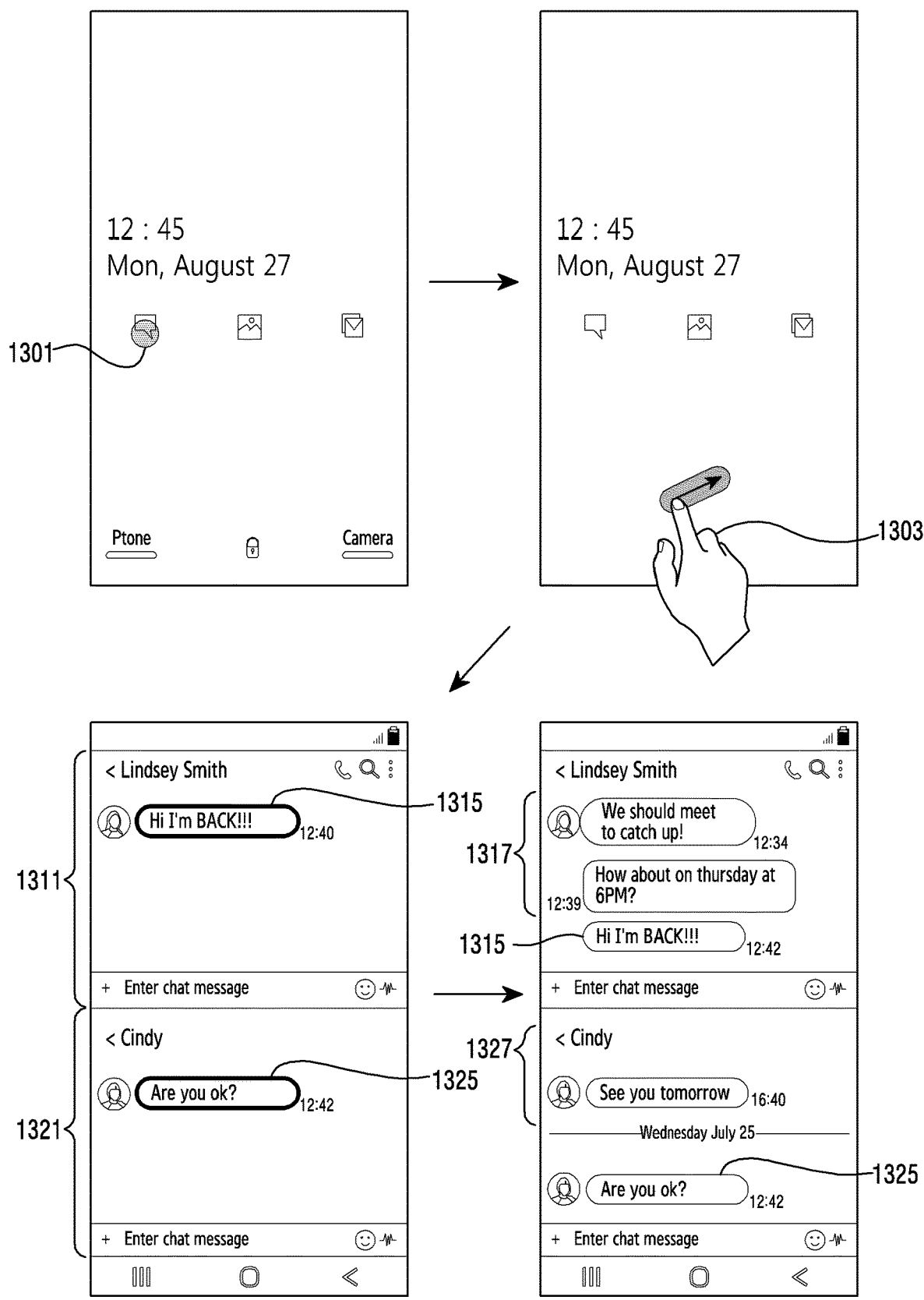
FIG. 13 is a screen configuration diagram for highlighting a plurality of new messages related to different users in an electronic device according to certain embodiments.

FIG. 12 is a flowchart for highlighting a plurality of new messages related to different users in an electronic device according to certain embodiments. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 12 will be described with reference to FIG. 13. FIG. 13 is a screen configuration diagram of highlighting a plurality of new messages related to different users in an electronic device according to certain embodiments.

Referring to FIG. 12, the electronic device (e.g., the processor 120 of FIG. 1) according to certain embodiments may detect a user input for a new message notification in a locked state, in operation 1201. According to an embodiment, operation 1201 of detecting the user input for the new message notification in a locked state may be the same as operation 251 of FIG. 2B. According to an embodiment, the new message notification may include notification information indicating that new messages related to two or more different message boxes have been received. For example, the new message notification may include notification information indicating that a new message to be included in a first message box and a new message to be included in a second message box have been received. The first message box and the second message box may have at least one other user. For example, the first message box may be associated with the first counterpart electronic device, and the second message box may be associated with the second counterpart electronic device. As another example, the first message box may be associated with the first counterpart electronic device and the second counterpart electronic device, and the second message box may be associated with the second counterpart electronic device. As another example, the first counterpart electronic device and the second counterpart electronic device may be related, and the second message box may be related to the second counterpart electronic device and a third counterpart electronic device.

According to an embodiment, the electronic device (e.g., the processor 120 and/or the display device 160 of FIG. 1) may display a lock release request screen in operation 1203. According to an embodiment, operation 1203 of displaying the lock release request screen may be the same as operation 253 of FIG. 2B.

According to an embodiment, the electronic device (e.g., the processor 120) may release the lock, based on an input for releasing the lock in operation 1205. According to an embodiment, operation 1205 of releasing the lock may be the same as operation 255 of FIG. 2B.

According to an embodiment, the electronic device (e.g., the processor 120) may divide the screen into at least two areas in operation 1207. According to an embodiment, the processor 120 may divide the screen, based on the number of message boxes corresponding to the new messages related to the new message notification. For example, if the new messages related to the new message notification are related to two message boxes, the processor 120 may divide the screen into two areas. As another example, when the new messages related to the new message notification are related to three message boxes, the processor 120 may divide the screen into three areas. According to an embodiment, when there are a plurality of message boxes corresponding to new messages related to a new message notification, the processor 120 may divide the screen into a designated number of areas. For example, when there are two or more message boxes corresponding to new messages related to new message notification, the processor 120 may divide the screen into two designated areas. For example, when a first user input 1301 is detected for a new message notification associated with the plurality of message boxes, and the lock is released by the second user input 1303, as illustrated in FIG. 13, the processor 120 may divide the screen of the display 160 into a first area 1311 and a second area 1321.

According to an embodiment, the electronic device (e.g., the processor 120 and the display device 160) may display a new message related to different message boxes in the divided first and second areas at a first time point, in operation 1209. According to an embodiment, the processor 120 may control the display 160 to display at least a portion of the first new message corresponding to the first message box in the first area at a first time point and to display at least a part of the second new message corresponding to the second message box in the second area. For example, as illustrated in FIG. 13, at a first time point, the processor 120 may control the display 160 to display a first message box including a new message related to "Lindsey Smith" in a first area 1311 and to display a second message box including a new message related to "Cindy" in a second area 1321. According to an embodiment, when there are three or more message boxes corresponding to new messages related to the new message notification, the processor 120 may select the first message box and the second message box, based on the reception time of the new message of each of the three or more message boxes. For example, when there are three new messages related to the new message notification and three new messages are included in each of three different message boxes, the processor 120 may select two message boxes among the three message boxes, based on when the new messages are received. The processor 120 may control new messages of the selected two message boxes to be displayed in the first area and the second area, respectively. According to an embodiment, the highlighting graphic effect may be applied to the new message displayed in each of the first area and the second area.

According to an embodiment, the electronic device (e.g., the processor 120) may display previous transmission/reception messages related to different message boxes in the first and second areas at the second time point, in operation 1211. According to an embodiment, the processor 120 may control the display 160 to display a previously transmitted/received message corresponding to the first message box in the first area and to display a previously transmitted/received message corresponding to the second message box in the second area, at the second time point. For example, as illustrated in FIG. 13, the processor 120 may control a previously transmitted/received 1317 to be additionally displayed in the first message box associated with "Lindsey Smith" and to the previously transmitted/received 1327 to be additionally displayed in the second message box associated with "Cindy" at the second time point. The processor 120 may remove the highlighting graphic effect applied to the new messages 1315 and 1325 in each of the first message box and the second message box at the second time point.

Figure 14:
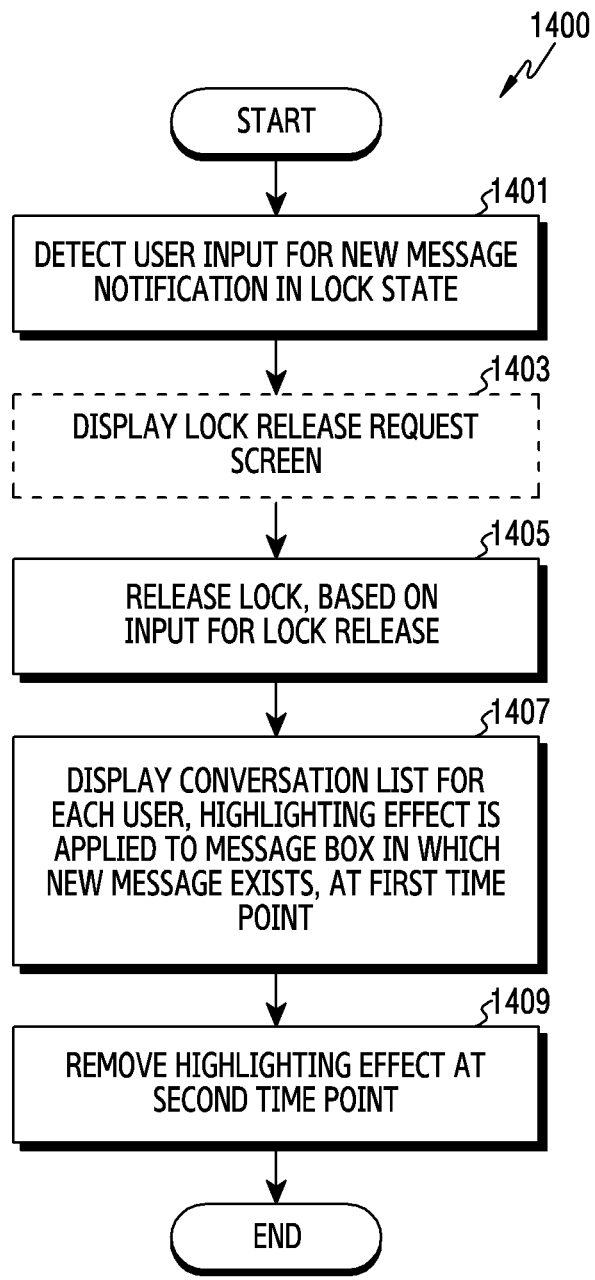
FIG. 14 is a flowchart for highlighting a dialog box including a new message in an electronic device according to certain embodiments.
Figure 15:
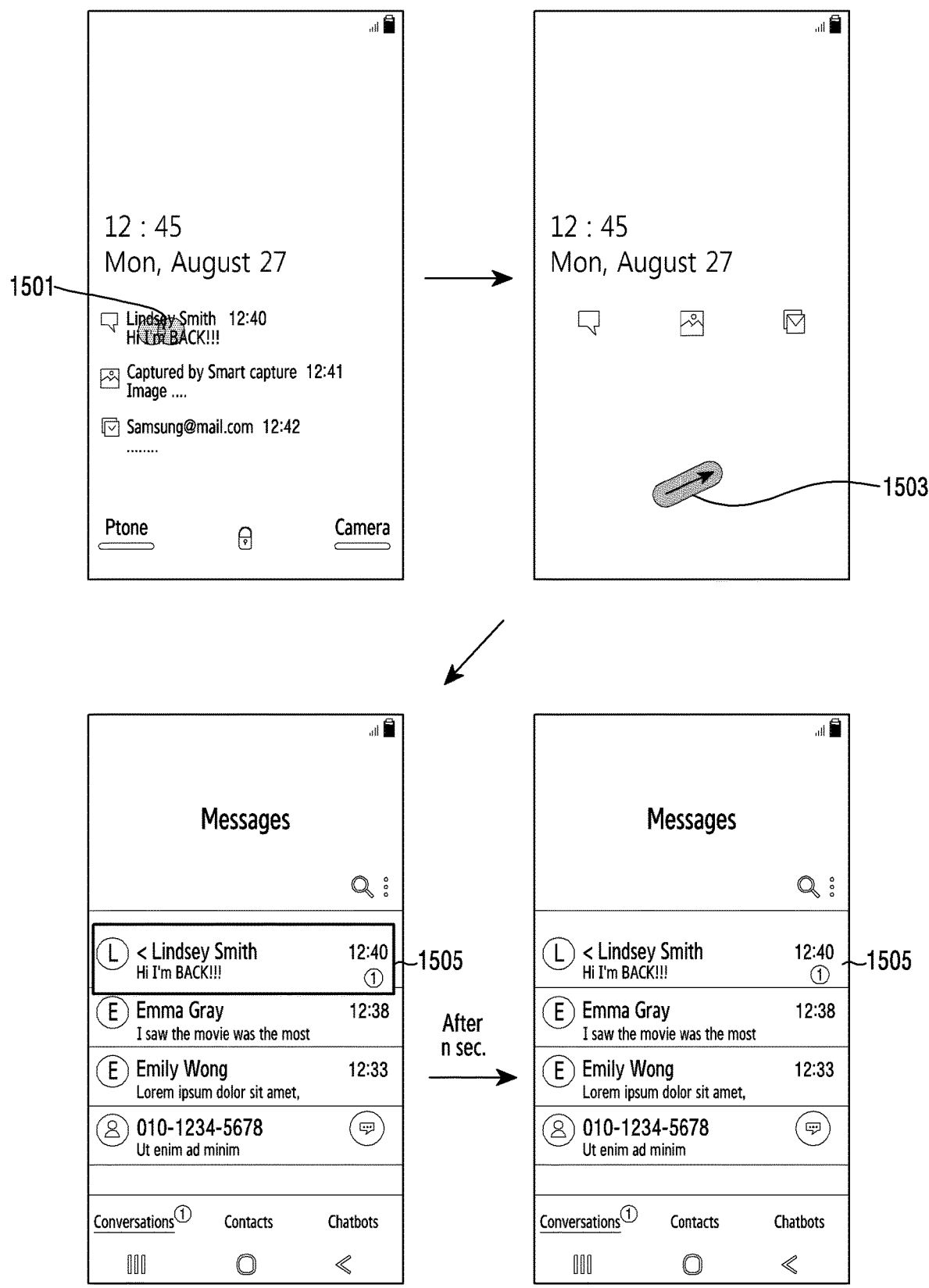
FIG. 15 is a screen configuration diagram for highlighting a dialog box including a new message in an electronic device according to certain embodiments.

FIG. 14 is a flowchart for highlighting a dialog box including a new message in an electronic device according to certain embodiments. In the following embodiments, the operations may be performed sequentially, but are not necessarily performed sequentially. For example, the order of each operation may be changed and at least two operations may be performed in parallel. Here, the electronic device may be the electronic device 101 of FIG. 1. Hereinafter, at least some operations of FIG. 14 will be described with reference to FIG. 15. FIG. 15 is a screen configuration diagram for highlighting a dialog box including a new message in an electronic device according to certain embodiments.

Referring to FIG. 14, an electronic device (e.g., the processor 120 of FIG. 1) according to certain embodiments may detect a user input for a new message notification in a locked state, in operation 1401. According to an embodiment, operation 1401 of detecting a user input for a new message notification in a locked state may be the same as operation 251 of FIG. 2B.

According to an embodiment, the electronic device (e.g., the processor 120 and/or the display device 160) may display a lock release request screen in operation 1403. According to an embodiment, operation 1403 of displaying a lock release request screen may be the same as operation 253 of FIG. 2B.

According to an embodiment, the electronic device (e.g., the processor 120) may release the lock, based on an input for unlocking in operation 1405. According to an embodiment, the operation 1405 of releasing the lock may be the same as operation 255 of FIG. 2B.

According to an embodiment, the electronic device (e.g., the processor 120 and or the display device 160) may display a conversation list for each user to which a highlighting graphic effect is applied to a message box in which a new message exists at a first time point, in operation 1407. The conversation list for each user may be a list including a plurality of message boxes corresponding to the plurality of users. The processor 120 may apply the highlighting graphic effect to at least one message box including a new message among a plurality of message boxes included in a conversation list for each user. For example, when a first user input 1501 is detected for a new message notification associated with the plurality of message boxes and is unlocked by the second user input 1503, the processor 120 may display by applying a highlighting graphic effect to a message box 1505 of "Lindsey Smith" including a new message in a conversation list for each user, as illustrated in FIG. 15. The highlighting graphic effects may include at least one of: an effect of changing the color of a message box, an effect of changing the size of a message box, an effect of synthesizing a graphic object in the message box, or an effect of displaying a graphic object in an area surrounding the message box. The plurality of message boxes included in the conversation list for each user may be arranged based on a time point at which the message was last transmitted/received with the corresponding counterpart electronic device. The processor 120 may determine the order of the at least one message box including the new message, based on a message box (fixed message box) designated to be fixed to the top of the conversation list for each user among the plurality of message boxes included in the conversation list for each user. According to an embodiment, when there is no fixed box at the top of the conversation list for each user, the processor 120 may arrange and display the at least one message box including the new message to be located at the top of the conversation list for each user. According to an embodiment, when there is a fixed message box at the top of the conversation list for each user, the processor 120 may arrange the at least one message box including the new message to be located below the fixed message box in the conversation list for each user, and control the display to display the at least one message box including the new message on the display. For example, when there is a fixed message box in a conversation list for each user, the processor 120 may control the display to display from a location where at least one message box including a new message exists, without displaying from the upper end of the conversation list for each user. As another example, the processor 120 may select a portion of the conversation list for each user to be displayed on the display, based on at least one of the number of message boxes fixed in the user-specific conversation list, the number of message boxes including new messages, or the number of message boxes that can be displayed on the screen. For example, when the number of fixed message boxes is 3, the number of message boxes including new messages is 1, and the number of message boxes that can be displayed on the screen is 4, the processor 120 may control the conversation list for each user to be displayed from the top so that three fixed message boxes and one message box including a new message may be displayed on the display. As another example, when the number of fixed message boxes is 4, the number of message boxes including new messages is 1, and the number of message boxes that can be displayed on the screen is 4, the processor 120 may control not to display the conversation list for each user at the top, but to display the message box including the new message on the display. When a user input of dragging toward the bottom is detected, the processor 120 may scroll down a conversation list for each user to display at least some of the message boxes fixed at the top on the display. According to an embodiment, the processor 120 may display an indicator indicating the existence of a new message and/or the number of new messages in a message box in which a new message exists.

According to an embodiment, the electronic device (e.g., the processor 120 and/or the display device 160) may remove the highlighting graphic effect at the second time point, in operation 1409. According to an embodiment, when the designated time elapses since the first time point, a second time point, the processor 120 may control the display 160 to remove the highlighting graphic effect applied to the message box in which the new message exists. For example, as illustrated in FIG. 15, when the second time point is reached, the processor 120 may display a conversation list for each user from which the emphasis graphic effect is removed. According to an embodiment, the indicator indicating the existence of the new message and/or the number of the new message may not be removed at the second time point and may be continuously displayed. The indicator indicating the existence of the new message and/or the number of the new message may be removed when the message of the message box is displayed by entering the message box by the user input.

According to an embodiment, an operation method of an electronic device may include: displaying a new message reception notification when receiving a new message, detecting a user input for the new message reception notification, and displaying the new message and at least one message transmitted/received before the new message, based on a designated time interval, in response to the user input.

According to an embodiment, the displaying the new message and at least one message transmitted/received before the new message, based on a designated time interval may include displaying the new message at a first time point, and displaying at least one message transmitted/received before the new message at a second time point, in response to the user input, such that the first time point and the second time point may have the designated time interval.

According to an embodiment, the first time point may be a time point earlier than the second time point by the designated time interval, and at least one message transmitted/received before the new message may be additionally displayed on a message application screen including the new message.

According to an embodiment, the first time point may be a time point later than the second time point by the designated time interval, and the new message may be additionally displayed on a message application screen including at least one message transmitted/received before the new message.

According to an embodiment, the displaying of the new message at the first time point may include applying a graphic effect for highlighting the new message at the first time point.

According to an embodiment, the graphic effect for highlighting the new message may be applied to at least one of the new message or a background area of the message application screen.

According to an embodiment, the displaying the new message and the at least one message transmitted/received before the new message, based on a designated time interval may include selecting at least one new message among a plurality of new messages, in case that the plurality of new messages exist, the message application screen including the selected at least one new message is displayed at the first time point, the at least one message transmitted/received before and the at least one new message that is not selected among the plurality of new messages are additionally displayed on the message application screen at the second time point, and the first time point is a time point ahead of the second time point by the designated time interval.

According to an embodiment, the selecting the at least one new message among the plurality of new messages may include selecting the at least one new message among the plurality of new messages, based on the contents of the new messages and the content of the at least one message transmitted/received before.

According to an embodiment, the new message reception notification is displayed on a lock screen when the new message is received in a lock state of the electronic device, and the lock releasing operation is performed, in case that the user input for the new message reception notification displayed on the lock screen is detected.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a display,
a processor, and a memory storing historical messages previously transceived by the electronic device, and instructions executable by the processor to cause the electronic device to:
  based on reception of an unread new message different from all the stored historical messages, control the display to display a notification indicating the reception of the unread new message on a first screen,
  detect an input corresponding to the notification,
  based on the input corresponding to the notification, control the display to display the unread new message on a second screen at a first time point in absence of any of the stored historical messages, and
  control the display to display at least one historical message from among the stored historical messages on the second screen at a second time point, after a designated time elapses from the first time point while maintaining display of the unread new message,
  wherein the second time point is later than the first time point.

2. The electronic device of claim 1,
wherein the second screen corresponds to a message application screen.

3. The electronic device of claim 1,
wherein the unread new message is displayed at a top portion of the second screen at the first time point, and
wherein the unread new message is displaced to a bottom portion of the second screen at the second time point.

4. The electronic device of claim 1, wherein the instructions are further executable by the processor to cause the electronic device to:
  apply a graphic effect highlighting the unread new message when the unread new message is displayed at the first time point.

5. The electronic device of claim 4, wherein the graphic effect highlighting the unread new message is applied to at least one of the unread new message and a background area of the second screen.

6. The electronic device of claim 4, wherein the instructions are further executable by the processor to cause the electronic device to: remove the graphic effect at a third time point occurring after at least one of the first time point and the second time point.

7. The electronic device of claim 1, wherein the unread new message is received as part of a transmission of a plurality of unread new messages distinct from the stored historical messages, and
wherein the instructions are further executable to cause the electronic device to:
  select a first unread new message from among the plurality of unread new messages,
  control the display to display the first unread new message at a third time point, and
  control the display to additionally display the at least one historical message and/or another unread new message from among the plurality of unread new messages at a fourth time point, after a designated time elapses from the third time point.

8. The electronic device of claim 7, wherein the first unread new message is selected from among the plurality of unread new messages based at least on content included in each of the plurality of unread new messages and the stored historical messages.

9. The electronic device of claim 1, wherein the first screen corresponds to a lock screen displayed when the electronic device is operating in a locked state,
wherein the instructions are further executable by the processor to cause the electronic device to execute a lock release operation based on the detected input corresponding to the notification, and
wherein the unread new message and the at least one historical message are displayed after execution of the lock release operation.

10. The electronic device of claim 9, wherein the instructions are further executable by the processor to cause the electronic device to:
  control the display to display a message associating release of the locked state of the electronic device based on the detected input,
  wherein the lock release operation is executed based on a lock release input received after displaying the message.

11. An operation method of an electronic device, the method comprising:
  storing in a memory historical messages previously transceived by the electronic device and previously read by a user;
  based on reception of an unread new message different from all the stored historical messages, displaying on a first screen a notification indicating reception of the unread new message;
  detecting by a processor an input corresponding to the notification;
  based on the input corresponding to the notification, displaying the unread new message on a second screen at a first time point in absence of any of the stored historical messages; and
  displaying at least one historical message from among the stored historical messages on the second screen at a second time point, after a designated time elapses from the first time point while maintaining display of the unread new message,
  wherein the second time point is later than the first time point.

12. The method of claim 11,
wherein the second screen corresponds to a message application screen.

13. The method of claim 11,
wherein the unread new message is displayed at a top portion of the second screen at the first time point, and
wherein the unread new message is displaced to a bottom portion of the second screen at the second time point.

14. The method of claim 11, wherein displaying the unread new message includes applying a graphic effect highlighting the unread new message when the unread new message is displayed at the first time point.

15. The method of claim 14, wherein the graphic effect highlighting the unread new message is applied to at least one of the unread new message and a background area of the second screen.

16. The method of claim 11, wherein the unread new message is received as part of a transmission of a plurality of unread new messages different from the stored historical messages, and
wherein the method further comprises:
  selecting a first unread new message from among the plurality of unread new messages;
  displaying the first unread new message as selected at a third time point; and
  displaying the at least one historical message and/or another unread new message from among the plurality of unread new messages at a fourth time point, after a designated time elapses from the third time point.

17. The method of claim 16, wherein the first unread new message is selected from among the plurality of unread new messages based at least on content included in each of the plurality of unread new messages and the stored historical messages.

18. The method of claim 11, wherein the first screen corresponds to a lock screen displayed when the electronic device is operating in a locked state, the method further comprising:
- executing a lock release operation based on the detected input corresponding to the notification,
- wherein the unread new message and the at least one historical message are displayed after execution of the lock release operation.

\* \* \* \* \*